United States Patent
Kim et al.

(10) Patent No.: US 9,897,868 B2
(45) Date of Patent: Feb. 20, 2018

(54) LCD AND METHOD OF MANUFACTURING THE SAME

(71) Applicant: Samsung Display Co. Ltd., Yongin (KR)

(72) Inventors: Sung Man Kim, Seongnam-si (KR); Won Ho Kim, Seongnam-si (KR); Min Chul Song, Suwon-si (KR); Seong Su Lim, Seoul (KR); Yeon Mun Jeon, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 51 days.

(21) Appl. No.: 14/986,790

(22) Filed: Jan. 4, 2016

(65) Prior Publication Data

US 2016/0370662 A1 Dec. 22, 2016

(30) Foreign Application Priority Data

Jun. 18, 2015 (KR) .................. 10-2015-0086299

(51) Int. Cl.
*G02F 1/1337* (2006.01)
*G02F 1/1343* (2006.01)
*G02F 1/1335* (2006.01)
*G02F 1/1362* (2006.01)

(52) U.S. Cl.
CPC .. *G02F 1/134309* (2013.01); *G02F 1/133514* (2013.01); *G02F 1/133707* (2013.01); *G02F 1/136286* (2013.01)

(58) Field of Classification Search
CPC ......... G02F 1/134309; G02F 1/133514; G02F 1/133707; G02F 1/136286
See application file for complete search history.

(56) References Cited

U.S. PATENT DOCUMENTS

| 2013/0242239 A1 | 9/2013 | Chang et al. | |
| 2014/0092353 A1* | 4/2014 | Matsushima | G02F 1/133512 349/110 |
| 2014/0152934 A1* | 6/2014 | Huh | G02F 1/133707 349/43 |

(Continued)

FOREIGN PATENT DOCUMENTS

| JP | 2009086629 | 4/2009 |
| KR | 1020010003751 | 1/2001 |

(Continued)

*Primary Examiner* — Nathanael R Briggs
(74) *Attorney, Agent, or Firm* — Cantor Colburn LLP

(57) ABSTRACT

A liquid crystal display includes: a first substrate, on which pixel regions are defined; a second substrate opposite to the first substrate; a liquid crystal layer between the first and second substrates; gate and data lines on the first substrate and intersecting each other; pixel electrodes on the first substrate in the pixel regions, respectively; and green, blue and red color filters on the second substrate, where the pixel electrodes include first, second and third pixel electrodes, which correspond to the green, blue and red color filters, respectively, each of the first, second and third pixel electrodes includes a stem portion, which is near one of the data lines and extends in an extending direction of the data lines, and branch portions, which are branched off from the stem portion, and the stem portion of the first pixel electrode is near a side of the second pixel electrode.

18 Claims, 16 Drawing Sheets

(56) References Cited

U.S. PATENT DOCUMENTS

| | | |
|---|---|---|
| 2014/0168582 A1 | 6/2014 | Chang et al. |
| 2014/0267994 A1 | 9/2014 | Ryu et al. |

FOREIGN PATENT DOCUMENTS

| | | |
|---|---|---|
| KR | 1020060071677 | 6/2006 |
| KR | 1020080025341 | 3/2008 |
| KR | 1020080028565 | 4/2008 |
| KR | 1020110111227 | 4/2008 |
| KR | 1020140113035 | 9/2014 |
| KR | 1020150019131 | 2/2015 |

\* cited by examiner

LCD AND METHOD OF MANUFACTURING THE SAME

This application claims priority to Korean Patent Application No. 10-2015-0086299 filed on Jun. 18, 2015, and all the benefits accruing therefrom under 35 U.S.C. § 119, the content of which in its entirety is herein incorporated by reference.

BACKGROUND

1. Field of the Invention

The invention relates to a liquid crystal display ("LCD") and a method of manufacturing the LCD.

2. Description of the Related Art

A liquid crystal display ("LCD") is a display device that displays an image using the electrical and optical properties of a liquid crystal material, i.e., a varying optical transmittance according to the intensity of an electric field applied to the liquid crystal material. The LCD typically includes a plurality of pixels, in each of which a pixel electrode and a color filter are disposed. The pixel electrode may be driven by a thin-film transistor.

The LCD has characteristics such as having a compact size, and low power consumption, but may have poor side visibility compared to its front visibility. To improve the side visibility of the LCD, various liquid crystal alignment structures and various pixel electrode structures have been developed.

In addition, various researches have been conducted on the application of the LCD as a display for a vehicle such as a display for a dashboard, a navigation or the like. Such an LCD for a vehicle is typically desired to secure a contrast ratio and high luminance in a horizontal direction in consideration of its location relative to a user.

SUMMARY

Exemplary embodiments of the invention provide a liquid crystal display ("LCD") having a high contrast ratio and high luminance in a horizontal direction.

According to an exemplary embodiment of the invention, a liquid crystal display ("LCD" includes: a first substrate, on which a plurality of pixel regions is defined; a second substrate disposed opposite to the first substrate; a liquid crystal layer disposed between the first and second substrates; a plurality of gate lines and a plurality of data lines disposed on the first substrate and intersecting each other; a plurality of pixel electrodes disposed on the first substrate in the pixel regions, respectively; and a plurality of green, blue and red color filters disposed on the second substrate. In such an embodiment, the pixel electrodes include first, second and third pixel electrodes, which correspond to the green, blue, and red color filters, respectively, each of the first, second and third pixel electrodes includes a stem portion, which is disposed near one of the data lines and extends in an extending direction of the data lines, and a plurality of branch portions, which are branched off from the stem portion, and the stem portion of the first pixel electrode is disposed near the second pixel electrode.

In an exemplary embodiment, the second pixel electrode may be disposed between the first pixel electrode and the third pixel electrode, and the stem portion of the third pixel electrode may be disposed near the second pixel electrode.

In an exemplary embodiment, each of the first, second and third pixel electrodes may further include an open slit pattern.

In an exemplary embodiment, the branch portions may be in a bar shape extending at an inclination with respect to an extending direction of the stem portion.

In an exemplary embodiment, each of the branch portions may include a main extension portion disposed in a middle of each of the branch portions, a first bent portion, which is disposed on one side of each of the branch portions and disposed between the stem portion and the main extension portion, and a second bent portion, which is disposed on the other side of each of the branch portions, and the first and second bent portions may be inclined with respect to a perpendicular direction to an extending direction of the stem portion.

In an exemplary embodiment, a degree to which the first or second bent portion is inclined with respect to the perpendicular direction to the extending direction of the stem portion may be greater than a degree to which the main extension portion is inclined with respect to the perpendicular direction to the extending direction of the stem portion.

In an exemplary embodiment, each of the first, second and third pixel electrodes may define a dual domain.

According to another exemplary embodiment of the invention, an LCD includes: a first substrate, on which a plurality of pixel regions is defined; a second substrate disposed opposite to the first substrate; a liquid crystal layer disposed between the first and second substrates; a plurality of gate lines and a plurality of data lines disposed on the first substrate and intersecting each other; a plurality of pixel electrodes disposed on the first substrate in the pixel regions, respectively; and a plurality of green, blue and red color filters disposed on the second substrate. In such an embodiment, the pixel electrodes include first, second and third pixel electrodes, which correspond to the green, blue and red color filters, respectively, each of the first, second and third pixel electrodes includes a stem portion, which is disposed near one of the data lines and extends in an extending direction of the data lines, and a plurality of branch portions, which are branched off from the stem portion, and the stem portion of the third pixel electrode is disposed near the second pixel electrode.

In an exemplary embodiment, each of the first, second and third pixel electrodes may further include an open slit pattern.

In an exemplary embodiment, the branch portions may be in a bar shape extending at an inclination with respect to an extending direction of the stem portion.

In an exemplary embodiment, each of the branch portions may include a main extension portion disposed in a middle of each of the branch portions, a first bent portion, which is disposed on one side of each of the branch portions and disposed between the stem portion and the main extension portion, and a second bent portion, which is disposed on the other side of each of the branch portions, and the first and second bent portions may be inclined with respect to a perpendicular direction to an extending direction of the stem portion.

In an exemplary embodiment, a degree to which the first or second bent portion is inclined with respect to the perpendicular direction to the extending direction of the stem portion may be greater than a degree to which the main extension portion is inclined with respect to the perpendicular direction to the extending direction of the stem portion.

In an exemplary embodiment, each of the first, second and third pixel electrodes may define a dual domain.

According to another exemplary embodiment of the invention, an LCD includes: a first substrate, on which a plurality of pixel regions is defined; a second substrate disposed opposite to the first substrate; a liquid crystal layer disposed between the first and second substrates; a plurality of gate lines and a plurality of data lines disposed on the first substrate and intersecting each other; a plurality of pixel electrodes disposed on the first substrate in the pixel regions, respectively; and a plurality of green, blue and red color filters disposed on the second substrate. In such an embodiment, the pixel electrodes include first, second and third pixel electrodes, which correspond to the green, blue and red color filters, respectively, each of the first, second and third pixel electrodes includes a first stem portion, which is disposed near one of the data lines and extends in an extending direction of the data lines, a second stem portion, which extends in the extending direction of the data lines and is spaced from the first stem portion in a perpendicular direction to the extending direction of the data lines, and a plurality of branch portions, which are disposed between, and branched off from, the first and second stem portions. In such an embodiment, a width of the first stem portion of the first pixel electrode is greater than a width of the second stem portion of the first pixel electrode, and the first stem portion of the first pixel electrode is disposed near the second pixel electrode.

In an exemplary embodiment, a width of the first stem portion of the third pixel electrode may be greater than a width of the second stem portion of the third pixel electrode, the third pixel electrode may be disposed between the first and second pixel electrodes, and the first stem portion of the third pixel electrode may be disposed near the second pixel electrode.

In an exemplary embodiment, each of the first, second and third pixel electrodes may further include a closed slit pattern.

In an exemplary embodiment, the branch portions ay be in a bar shape extending at an inclination with respect to an extending direction of the first stem portion.

In an exemplary embodiment, each of the branch portions may include a main extension portion disposed in a middle of each of the branch portions, a first bent portion, which is disposed between the first stem portion and the main extension portion, and a second bent portion, which is disposed between the second stem portion and the main extension portion, and the first and second bent portions may be inclined with respect to a perpendicular direction to an extending direction of the first stem portion.

In an exemplary embodiment, a degree to which the first or second bent portion is inclined with respect to the perpendicular direction to the extending direction of the first stem portion may be greater than a degree to which the main extension portion is inclined with respect to the perpendicular direction to the extending direction of the first stem portion.

In an exemplary embodiment, each of the first, second and third pixel electrodes may define a dual domain.

According to exemplary embodiments, an LCD may secure a contrast ratio and high luminance in a horizontal direction. In such embodiment, color mixing defects may be effectively prevented.

BRIEF DESCRIPTION OF THE DRAWINGS

The above and other aspects and features of the invention will become more apparent by describing in detail exemplary embodiments thereof with reference to the attached accompanying drawings, in which.

DETAILED DESCRIPTION

Figure 1:
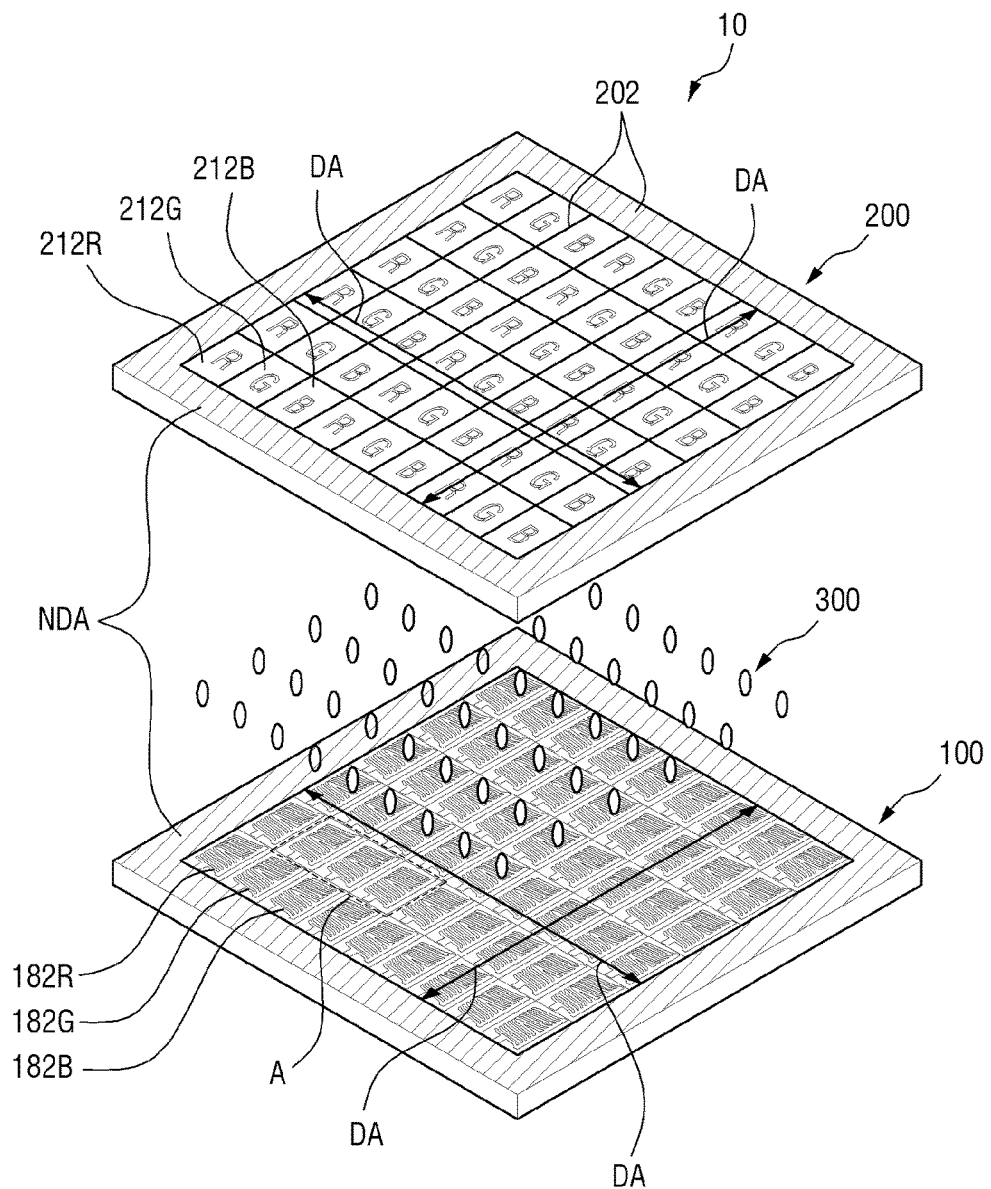
FIG. 1 is an exploded perspective view of a liquid crystal display ("LCD") according to an exemplary embodiment of the invention.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

The description that one element is connected to or coupled to another element includes both a case where the one element is directly connected to the another element or a case where further another element is interposed between the elements. However, the description that one element is directly connected or directly coupled to another element indicates that there is no further another element between the elements. The term "and/or" includes any and all combinations of one or more of the associated listed items.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments will hereinafter be described with reference to the accompanying drawings.

Figure 2:
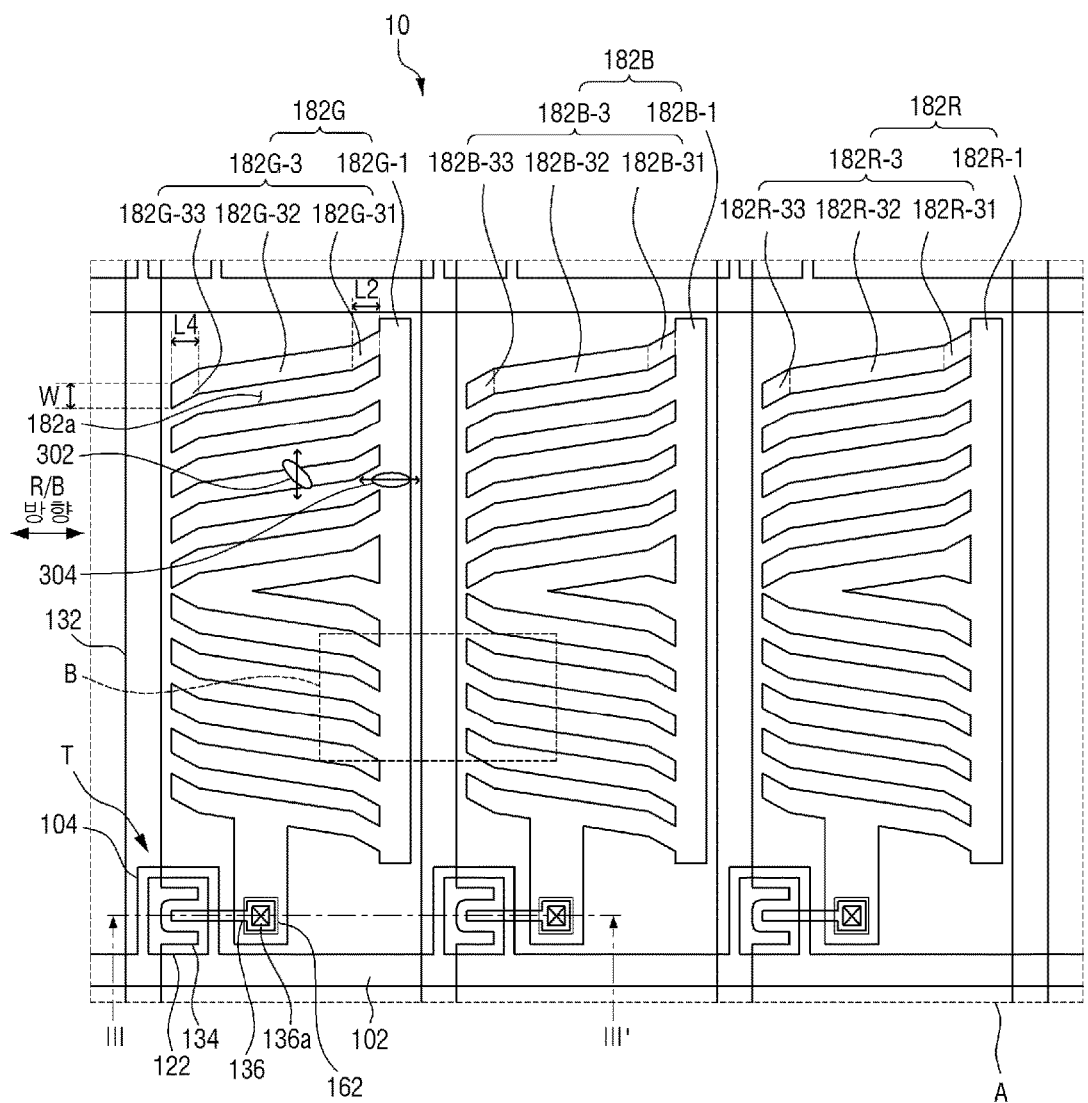
FIG. 2 is a plan view of area A of FIG. 1.
Figure 3:
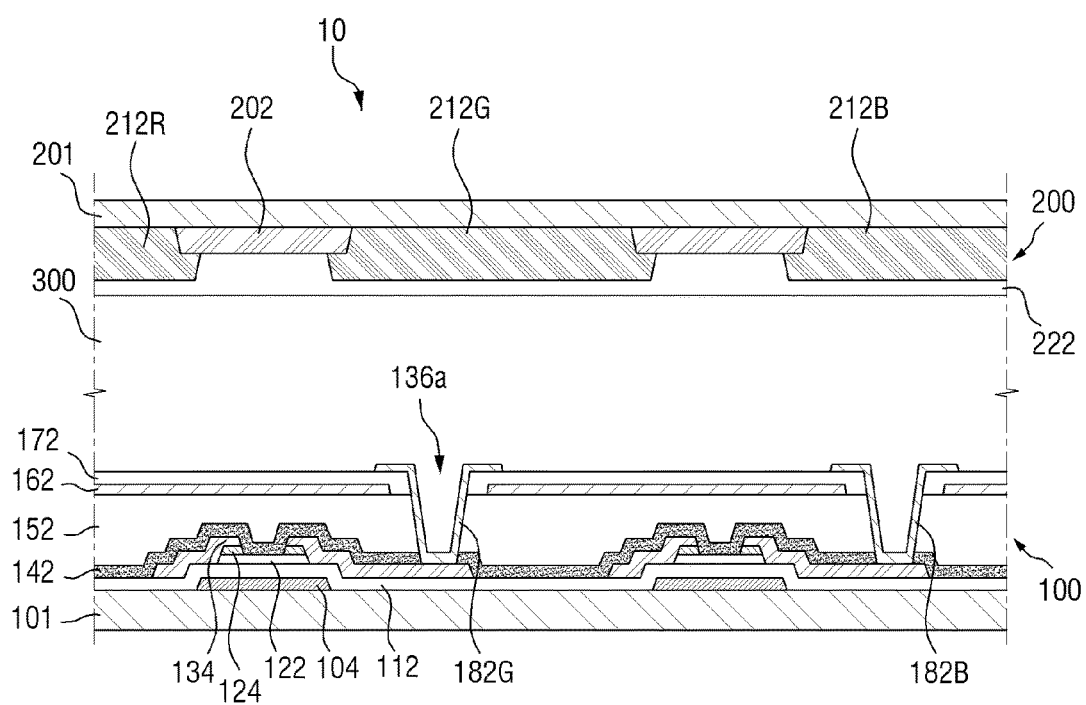
FIG. 3 is a cross-sectional view taken along line III-Ill' of FIG. 2.
Figure 4:
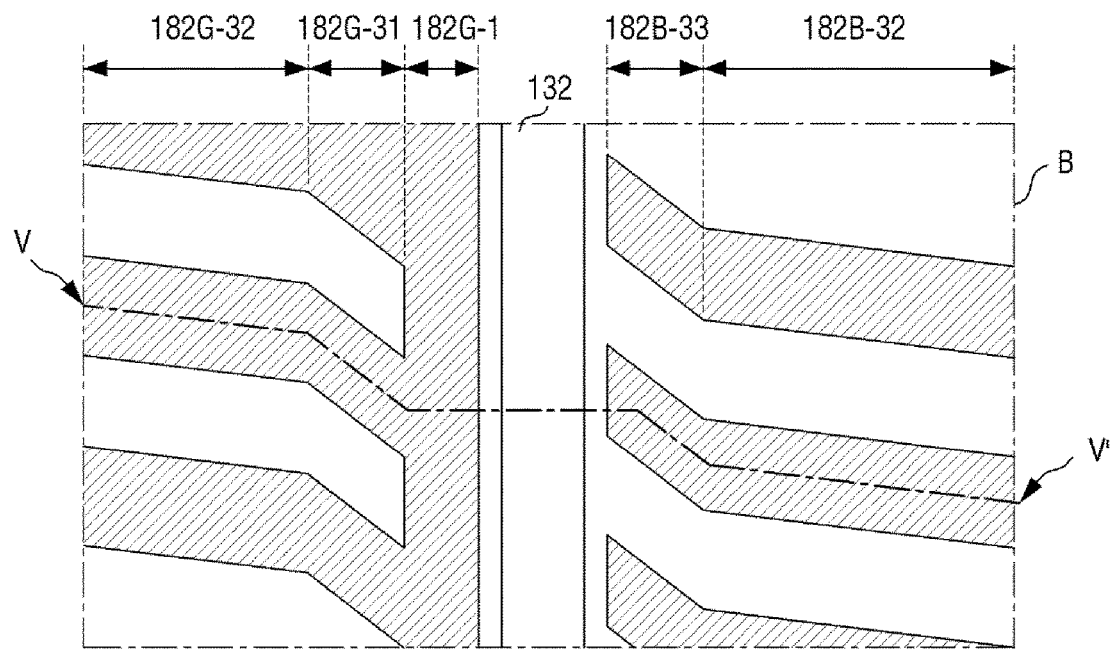
FIG. 4 is an enlarged view of area B of FIG. 2.
Figure 5:
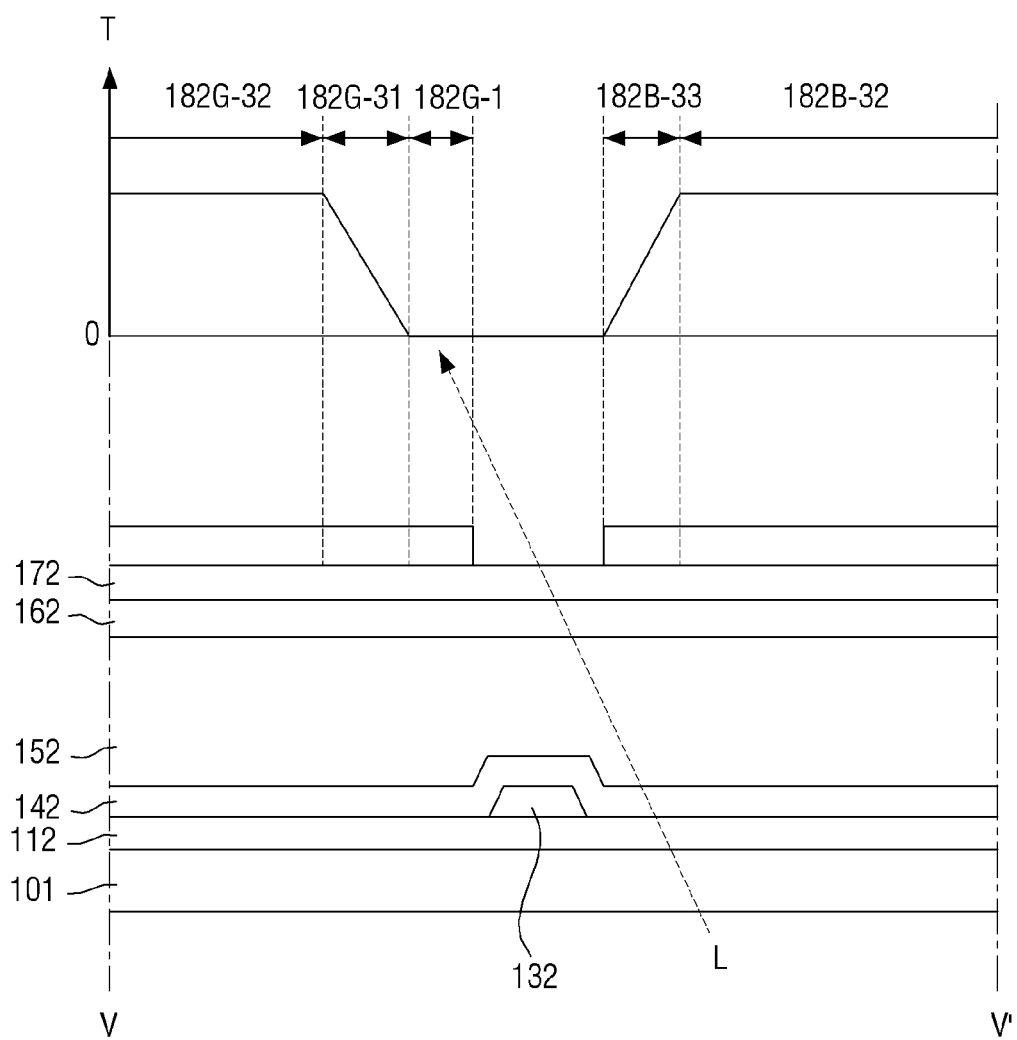
FIG. 5 is a schematic view illustrating the light transmittance in area B of FIG. 2.

FIG. 1 is an exploded perspective view of a liquid crystal display ("LCD") according to an exemplary embodiment of the invention. FIG. 2 is a plan view of area A of FIG. 1. FIG. 3 is a cross-sectional view taken along line III-III' of FIG. 2. FIG. 4 is an enlarged view of area B of FIG. 2. FIG. 5 is a schematic view illustrating the light transmittance in area B of FIG. 2.

Referring to FIGS. 1 to 5, an exemplary embodiment of an LCD 10 includes a first display panel 100, a second display panel 200 disposed opposite to the first display panel 100, and a liquid crystal layer 300 interposed between the first and second display panels 100 and 200.

Each of the first and second display panels 100 and 200 includes a display area DA and a non-display area NDA. In the display area DA, a plurality of pixels, which are arranged substantially in a matrix, may be defined.

In the display area DA of the first display panel 100, a plurality of pixel electrodes (182G, 182B, and 182R) may be provided for the pixels, respectively. Each of the pixel electrodes (182G, 182B, and 182R) may receive a data voltage through a thin-film transistor T. A common electrode 162, which is integrally formed as a single unitary and indivisible unit, may be disposed on the entire surface of the display area DA regardless of the pixels. The pixel electrodes (182G, 182B, and 182R) and the common electrode 162 may be isolated or insulated from each other by a second passivation layer 172. The pixel electrodes (182G, 182B, and 182R) may generate an electric field together with the common electrode 162 and may thus control a direction of the alignment of liquid crystal molecules in the liquid crystal layer 300.

In the non-display area NDA of the first display panel 100, a driving unit that provides signals, e.g., a gate driving signal, a data driving signal and the like, to each of the pixels in the display area DA may be provided.

In the display area DA of the second display substrate 200, a plurality of color filters (212R, 212G, and 212B) may be provided for each pixel. The color filters (212R, 212G, and 212B) may include red, green and blue color filters 212R, 212G and 212B. In an exemplary embodiment, as shown in FIG. 1, the red, green and blue color filters 212R, 212G and 212B may be alternately arranged. A light-blocking pattern 202 may be disposed along the boundaries between the red, green and blue color filters 212R, 212G and 212B. The light-blocking pattern 202 may be further provided in the non-display area NDA of the second display substrate 200.

The first and second display panels 100 and 200 may be bonded together by a sealing member (not illustrated), which includes a sealant or the like. The sealing member may be provided on the non-display area NDA in the periphery of the first and second display panels 100 and 200.

The liquid crystal layer 300, which includes liquid crystal molecules with positive dielectric anisotropy or negative dielectric anisotropy, may be interposed between the first and second display panels 100 and 200.

The structure of the pixels of the LCD 10 will hereinafter be described in detail.

First, the first display panel 100 will hereinafter be described. Referring to FIGS. 2 and 3, the first display panel 100 includes a first substrate 101 as a base substrate thereof. The first substrate 101 may be an insulating substrate. In an exemplary embodiment, the first substrate 101 may include an insulating material such as transparent glass, quartz, ceramic, silicon or transparent plastic, for example, but not being limited thereto. The material of the first substrate 101 may be appropriately selected.

In an exemplary embodiment, the first display panel 100 may further include a plurality of gate wires (102 and 104) and a plurality of data wires (132, 134, and 136), which are disposed on the first display substrate 101.

The gate wires (102 and 104) may include a plurality of gate lines 102 and a plurality of gate electrodes 104. The data wires (132, 134, and 136) may include a plurality of data lines 132, a plurality of source electrodes 134, and a plurality of drain electrodes 136.

The gate wires (102 and 104) and the data wires (132, 134, and 136) may include or be formed of an aluminum (AD-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), titanium (Ti) or tantalum (Ta). The gate wires (102 and 104) and the data wires (132, 134, and 136) may have a multilayer structure including two conductive films having different physical properties from each other. In one exemplary embodiment, for example, one conductive film of the two conductive films may include or be formed of an Al-based metal, an Ag-based metal, or a Cu-based metal and the other conductive film of the two conductive films may include or be formed of a Mo-based metal, Cr, Ti, or Ta. In one exemplary embodiment, for example, the two conductive films include a Cr lower film and an Al upper film or an Al lower film and a Mo upper film. However, the invention is not limited thereto, and alternatively, the gate wires (102 and 104) and the data wires (132, 134, and 136) may be formed of various metals and conductors other than those set forth herein.

The gate lines 102 may extend in a first direction, for example, a horizontal direction or a pixel row direction, along the horizontal boundaries between the pixel, and the data lines 132 may extend in a second direction, for example, a vertical direction or a pixel column direction, along the vertical boundaries between the pixels. The gate lines 102 and the data lines 132 may intersect each other and may thus define a plurality of pixel regions. In an exemplary embodiment, the pixel regions may be defined by being surrounded by the gate lines 102 and the data lines 132, but not being limited thereto. Alternatively, the pixel regions may be defined by a black matrix.

One or more gate electrodes 104 are connected to each of the gate lines 102 for each of the pixels. The gate electrodes 104 may be branched off from the corresponding gate line 102 toward a semiconductor layer 122 or may be defined by extensions of the corresponding gate line 102, but the invention is not limited thereto. In an alternative exemplary embodiment, the gate electrodes 104 may be defined by a portion of a corresponding gate line 102 in the overlapping area of the corresponding gate line 102 and the semiconductor layer 122 on a path of the extension of the corresponding gate line 102.

One or more source electrodes 134 are connected to each of the data lines 132 for each of the pixels. The source electrodes 134 may be branched off from the corresponding data line 132 toward the semiconductor layer 122 or may be defined by extensions of the corresponding data line 132, but the invention is not limited thereto. In an alternative exemplary embodiment, the source electrodes 134 may be defined by a portion of a corresponding data line 132 in the overlapping area of the corresponding data line 132 and the semiconductor layer 122 on a path of the extension of the corresponding data line 132. A drain electrode 136 and a source electrode 104 corresponding to each other may be spaced from each other relative to the semiconductor layer 122, and may be electrically connected to the pixel electrodes (182G, 182B, and 182R) through one or more contact holes 136a, which are defined or formed through a first passivation layer 142, an organic layer 152 and the second passivation layer 172.

A gate insulating layer 112 may be disposed between the gate wires (102 and 104) and the data wires (132, 134, and 136), and may insulate the gate wires (102 and 104) and the data wires (132, 134, and 136) from each other. In an exemplary embodiment, the gate insulating layer 112 may be disposed on the gate wires (102 and 104), and the data wires (132, 134, and 136) may be disposed on the gate insulating layer 112. The gate insulating layer 112 may include or be formed of, for example, silicon nitride (SiNx), silicon oxide (SiO$_2$), silicon oxynitride (SiON) or a combination thereof, or a deposition layer thereof.

The semiconductor layer 112 is disposed on the gate insulating layer 112, and may include or be formed of, for example, hydrogenated amorphous silicon or polycrystalline silicon. The semiconductor layer 122 may be disposed to at least partially overlap the gate electrodes 104. The semiconductor layer 122 may define or form a plurality of thin film transistors ("TFT"s) together with the gate electrodes 104, the source electrodes 134 and the drain electrodes 136, and a channel of the TFT may be formed therein.

The semiconductor layer 122 may have various shapes such as an island or linear shape. The semiconductor layer 122 is illustrated in FIGS. 1 to 5 as having an island shape, but the invention is not limited thereto. Although not specifically illustrated, in an alternative exemplary embodiment, where the semiconductor layer 122 is in a linear shape, the semiconductor layer 122 may overlap data wires (132, 134, and 136). A portion of the semiconductor layer 122 may be provided in a space defined between the source electrodes 134 and the drain electrodes 136, and are isolated from another portion of the semiconductor layer 122, and may thus define a channel area.

An ohmic contact layer 124, which includes or is formed of n+ hydrogenated amorphous silicon doped with a high concentration of n-type impurities, may be disposed on the semiconductor layer 122. The ohmic contact layer 124 is disposed between the source electrodes 134 and the respective drain electrodes 136 and thus reduces the contact resistance between the source electrodes 134 and the respective drain electrodes 136. The ohmic contact layer 124, like the semiconductor layer 122, may have various shapes such as an island or linear shape. In an exemplary embodiment, where the semiconductor layer 122 is in an island shape, the ohmic contact layer 124 may be in an island shape. In an alternative exemplary embodiment, where the semiconductor layer 122 is in a linear shape, the ohmic contact layer 124 may be in a linear shape. Accordingly, the ohmic contact layer 124, unlike the semiconductor layer 122, is disconnected in the space between the source electrodes 134 and the drain electrodes 136, and the disconnected portions of the ohmic contact layer 124 in the space are spaced apart from each other, and may thus expose the semiconductor layer 122 therethrough.

In response to a gate-on signal applied to the gate electrodes 104, a channel is formed in the semiconductor layer 122, such that the TFTs may be turned on, and the drain electrodes 136 may receive a data signal from the respective source electrodes 134 and may provide the received data signal to the pixel electrodes (182G, 182B, and 182R).

The first passivation layer 142 is disposed on the data wires (132, 134, and 136) and an exposed part of the semiconductor layer 122. The contact holes 136a, which expose at least part of the drain electrodes 136, may be defined or formed in the first passivation layer 142.

The first passivation layer 142 may include, for example, an inorganic material, such as silicon nitride or silicon oxide, or a material formed by plasma enhanced chemical vapor deposition ("PECVD"), such as a-Si:C:O or a-Si:O:F.

An organic layer 152 may be disposed on the first passivation layer 142. The contact holes 136a, which expose at least part of the drain electrodes 136, are further defined through the organic layer 152. The organic layer 152 may include a material having a high planarization characteristic. The organic layer 152 may include a photosensitive material.

The common electrode 162 may be disposed on the organic layer 152. The common electrode 162 may receive a common electrode and may generate an electric field together with the pixel electrodes (182G, 182B, and 182R). One or more openings, which expose the areas where the contact holes 136a, may be formed or defined in the common electrode 162. The common electrode 162 may cover the entire pixel regions surrounded by the gate lines 102 and the data lines 132, except for the portions thereof corresponding to the openings. The common electrode 162 may include a transparent conductive material such as indium tin oxide ("ITO") or indium zinc oxide ("IZO"), for example, but the invention is not limited thereto.

The second passivation layer 172 may be disposed on the organic layer 152 and the common electrode 162. The contact holes 136a, which expose at least part of the drain electrodes 136, may be further defined through the second passivation layer 172. The second passivation layer 172 may include an inorganic insulating material. In one exemplary embodiment, for example, the second passivation layer 172 may include silicon nitride or silicon oxide.

The pixel electrodes (182G, 182B, and 182R) may generate an electric field together with the common electrode 162 and may rotate the liquid crystal molecules in the liquid crystal layer 300. The pixel electrodes (182G, 182B, and 182R) may include a transparent conductive material such as ITO or IZO, but the invention is not limited thereto.

The pixel electrodes (182G, 182B, and 182R) may be disposed on the second passivation layer 172 for each of the pixels. Portions of the pixel electrodes (182G, 182B, and 182R) may be disposed in the contact holes 136a. The portions of the pixel electrodes (182G, 182B, and 182R) in the contact holes 136a may contact the drain electrodes 136 to be electrically connected thereto. The second passivation layer 172 is disposed between the pixel electrodes pixel electrodes (182G, 182B, and 182R) and the common electrode 162, and insulates the pixel electrodes (182G, 182B, and 182R) and the common electrode 162 from each other.

The structure of the pixel electrodes (182G, 182６, and 182R) will be described later in detail.

The second display panel 200 will hereinafter be described. Referring to FIGS. 1 and 3, the second display panel 200 includes a second substrate 201 as a base substrate thereof. The second substrate 201 may be an insulating substrate. In an exemplary embodiment, the second substrate 201, like the first substrate 101, may include an insulating material such as transparent glass, quartz, ceramic, silicon or transparent plastic, for example.

The light-blocking pattern 202 and the color filters (212R, 212G, and 212B) may be disposed on the second substrate 201.

The light-blocking pattern 202 may extend along edges of each pixel, and may expose each pixel region. In an exemplary embodiment, the light-blocking pattern 202 may be a lattice pattern.

The light-blocking pattern 202 may include or be formed of a material that blocks a transmission of light incident of thereupon. The light-blocking pattern 202 may reflect or absorb incident light thereto. In one exemplary embodiment, for example, the light-blocking pattern 202 may include or be formed of a metal having a high reflectance such as Cr to provide a light-blocking effect. Alternatively, the light-blocking pattern 202 may include an organic film (or a black organic film) including a material such as a black dye or pigment to effectively absorb the light incident thereupon and thus to provide a light-blocking effect. In some exemplary embodiments, the light-blocking pattern 202 may be defined by a stack of a metal film and a black organic film.

Each of the color filters (212R, 212G and 212B) may include an organic film including a pigment or dye for displaying a color. Each of the color filters (212R, 212G and 212B) may occupy a pixel region. The color filters (212R, 212G, and 212B) may include the red, green and blue color filters 212R, 212G and 212B. Each of the red, green and blue color filters 212R, 212G and 212B may be provided in a pixel and may thus define a red, green or blue pixel. The color filters (212R, 212G, and 212B) may be disposed to overlap the pixel electrodes (182G, 182B, and 182R).

The color filters (212R, 212G, and 212B) may be disposed on the light-blocking pattern 202. In an exemplary embodiment, parts of the color filters (212R, 212G, and 212B) may extend over to the light-blocking pattern 202 at the boundaries between the pixels, and may thus partially overlap the light-blocking pattern 202. An overcoat layer 222 may be disposed on the color filters (212R, 212G, and 212B). The overcoat layer 222 may include a transparent organic layer.

An alignment layer (not illustrated), which may align the liquid crystal layer 300, may be disposed on the pixel electrodes (182G, 182B, and 182R).

In some exemplary embodiments, the color filters (212R, 212G, and 212B) may be disposed on the second display panel 200, as illustrated in FIG. 3, but the invention is not limited thereto. In an alternative exemplary embodiment, the color filters (212R, 212G, and 212B) may be disposed in the first display panel 100 to overlap the pixel electrodes (182G, 182B, and 182R). In one exemplary embodiment, for example, the color filters (212R, 212G, and 212B) may be disposed between the first passivation layer 142 and the organic layer 152 of FIG. 3. In such an embodiment, the color filters (212R, 212G, and 212B) may be completely covered by the organic layer 152. In such an embodiment, the light-blocking pattern 202 may be disposed on the first display panel 100, rather than on the second display panel 200. Various modifications that may be made to the arrangement of the color filters (212R, 212G, and 212B) and the light-blocking pattern 202 are already well known and obvious in the field to which the invention pertains, and thus, detailed descriptions thereof will be omitted.

The structure of the pixel electrodes (182G, 182B, and 182R) of the LCD 10 will hereinafter be described.

The pixel electrodes (182G, 182B, and 182R) may include a first pixel electrode 182G corresponding to the green color filter 212G, a second pixel electrode 182B corresponding to the blue color filter 212B, and a third pixel electrode 182R corresponding to the red color filter 212R. In an exemplary embodiment, the pixel electrodes (182G, 182B, and 182R) may be arranged in a manner such that the first pixel electrode 182G corresponding to the green color filter 212G may be disposed on one side (for example, on the left side) of the second pixel electrode 182B corresponding to the blue color filter 212B and the third pixel electrode 182R corresponding to the red color filter 212R may be disposed on the other side (for example, the right side) of the second pixel electrode 182B corresponding to the blue color filter 212B.

In one exemplary embodiment, for example, as illustrated in FIG. 1, the pixel electrodes (182G, 182B, and 182R) may be arranged in a manner such that the first, second and third pixel electrodes 182G, 182B and 182R may be sequentially/repeatedly arranged in the first direction (for example, the pixel row direction) and one of the first, second, and third pixel electrodes 182G, 182B, and 182R may be continually/repeatedly arranged.

Each of the first, second and third pixel electrodes 182G, 182B and 182R includes a stem portion 182G-1, 182B-1 or 182R-1, and a plurality of branch portions 182G-3, 182B-3 or 182R-3, which are branched off from the stem portion 182G-1, 182B-1 or 182R-1.

In some exemplary embodiments, the branch portions 182G-3, 182B-3 or 182R-3 may be arranged to define a dual domain including upper and lower domains where liquid crystal directors in the liquid crystal layer 300 in the domains are aligned in different directions. In response to the branch portions 182G-3, 182B-3 or 182R-3 being arranged to define a dual domain, the branch portions 182G-3, 182B-3 or 182R-3 may be vertically symmetrical, that is symmetric to each other with respect to an imaginary middle line in a horizontal direction through a center thereof, as illustrated in FIG. 2, but the invention is not limited thereto. In an alternative exemplary embodiment, the first, second and third pixel electrodes 182G, 182B and 182R may include the stem portion 182G-1, 182B-1 or 182R-1 and the branch portions 182G-3, 182B-3 or 182R-3, which are arranged to define more than a triple- or multi-domain or a single domain.

Each of the stem portions 182G-1, 182B-1 and 182R-1 may be disposed in a side portion of a corresponding pixel region neighboring an adjacent pixel region. Each of the stem portions 182G-1, 182B-1 and 182R-1 may be in a bar shape extending in the same direction as the data lines 132. In such an embodiment, the stem portions 182G-1, 182B-1 and 182R-1 may be disposed near the data lines 132 as vertical bars extending in the same direction as the data lines 132. The stem portions 182G-1, 182B-1 and 182R-1 may be in a rectangular shape, when viewed from a plan view, in which longitudinal sides thereof extend in the same direction as the data lines 132.

The branch portions 182G-3, 182B-3 or 182R-3 may be branched off from the stem portion 182G-1, 182B-1 or 182R-1 to extend across the corresponding pixel. The extending direction of the branch portions 182G-3, 182B-3 or 182R-3 may almost perpendicularly intersect the extending direction of the stem portion 182G-1, 182B-1 or 182R-1. The expression "almost perpendicularly", as used herein, encompasses not only a case when the direction in which the branch portions 182G-3, 182B-3 or 182R-3 extend and the direction in which the stem portion 182G-1, 182B-1 or 182R-1 extends cross each other at right angles, but also a case when the angle between the direction in which the branch portions 182G-3, 182B-3 or 182R-3 extend and the direction in which the stem portion 182G-1, 182B-1 or 182R-1 extends are in the range of about ±60°. The branch portions 182G-3, 182B-3 or 182R-3 may be branched off from the stem portion 182G-1, 182B-1 or 182R-1 and may form a comb shape.

In some exemplary embodiments, each of the branch portions 182G-3, 182B-3 or 182R-3 may include a main extension portion 182G-32, 182B-32 or 182R-32, a first bent portion 182G-31, 182B-31 or 182R-31, and a second bent portion 182G-33, 182B-33 or 182R-33.

The first bent portion 182G-31, 182B-31 or 182R-31 may be disposed between the stem portion 182G-1, 182B-1 or 182R-1 and the main extension portion 182G-32, 182B-32 or 182R-32, which is disposed in a middle of the corresponding branch portion 182G-3, 182B-3 or 182R-3. The second bent portion 182G-33, 182B-33 or 182R-33 may be disposed at an opposite side of main extension portion 182G-32, 182B-32 or 182R-32 to the first bent portion 182G-31, 182B-31 or 182R-31.

The first bent portion 182G-31, 182B-31 or 182R-31 may be branched off from the stem portion 182G-1, 182B-1 or 182R-1 at an inclination with respect to a perpendicular direction to the extending direction of the stem portion 182G-1, 182B-1 or 182R-1. The first bent portion 182G-31, 182B-31 or 182R-31 may be parallelogram-shaped in a plan view.

The main extension portion 182G-32, 182B-32 or 182R-32 may be in a bar shape extending from the first bent portion 182G-31, 182B-31 or 182R-31. In an exemplary embodiment, the main extension portion 182G-32, 182B-32 or 182R-32 may be in a bar shape extending at an inclination with respect to the perpendicular direction the extending direction of the stem portion 182G-1, 182B-1 or 182R-1. The main extension portion 182G-32, 182B-32 or 182R-32 may be parallelogram-shaped in a plan view.

As illustrated in FIG. 2, the degree to which the first bent portion 182G-31, 182B-31 or 182R-31 is inclined may be greater than the degree to which the main extension portion 182G-32, 182B-32 or 182R-32 is inclined. That is, an angle between the first bent portion 182G-31, 182B-31 or 182R-31 and a direction perpendicular to the extending direction of the stem portion 182G-1, 182B-1 or 182R-1 is greater than an angle between the main extension portion 182G-32, 182B-32 or 182R-32 and the direction perpendicular to the extending direction of the stem portion 182G-1, 182B-1 or 182R-1.

The second bent portion 182G-33, 182B-33 or 182R-33 may extend from the main extension portion 182G-32, 182B-32 or 182R-32. The second bent portion 182G-33, 182B-33 or 182R-33 may extend at an inclination with respect to the perpendicular direction to the extending direction of the stem portion 182G-1, 182B-1 or 182R-1. The second bent portion 182G-33, 182B-33 or 182R-33 may be parallelogram-shaped in a plan view.

The degree to which the first bent portion 182G-31, 182B-31 or 182R-31 is inclined may be substantially the same as the degree to which the second bent portion 182G-33, 182B-33 or 182R-33 is inclined, but the invention is not limited thereto.

The expression "at an inclination" or "inclined", as used herein, implies that the first bent portion 182G-31, 182B-31 or 182R-31 and the second bent portion 182G-33, 182B-33 or 182R-33 are at an inclination or forms an angle of about ±60° with respect to the perpendicular direction to the direction in which the stem portion 182G-1, 182B-1 or 182R-1 extends or the extending direction of the stem portion 182G-1, 182B-1 or 182R-1.

The first bent portion 182G-31, 182B-31 or 182R-31, the main extension portion 182G-32, 182B-32 or 182R-32, and the second bent portion 182G-33, 182B-33 or 182R-33 may have the same width as each other, i.e., a width W, but the invention is not limited thereto. Alternatively, the first bent portion 182G-31, 182B-31 or 182R-31, the main extension portion 182G-32, 182B-32 or 182R-32, and the second bent portion 182G-33, 182B-33 or 182R-33 may have different widths from one another.

A length L2 of the first bent portion 182G-31, 182B-31 or 182R-31 may be substantially the same as a length L4 of the second bent portion 182G-33, 182B-33 or 182R-33, but the invention is not limited thereto. Alternatively, the length L2 of the first bent portion 182G-31, 182B-31 or 182R-31 may differ from the length L4 of the second bent portion 182G-33, 182B-33 or 182R-33.

The length of the main extension portion 182G-32, 182B-32 or 182R-32 may be greater than the length L2 of the first bent portion 182G-31, 182B-31 or 182R-31 and the length L4 of the second bent portion 182G-33, 182B-33 or 182R-33, but the invention is not limited thereto. Alternatively, the length of the main extension portion 182G-32, 182B-32 or 182R-32 may be the same as or less than the length L2 of the first bent portion 182G-31, 182B-31 or 182R-31 and the length L4 of the second bent portion 182G-33, 182B-33 or 182R-33.

In such an embodiment, where each of the pixel electrodes (182G, 182B, and 182R) includes the first bent portion 182G-31, 182B-31 or 182R-31 and the second bent portion 182G-33, 182B-33 or 182R-33, the liquid crystal molecules in the liquid crystal layer 300 may return to an original state or location thereof after being moved by electric filed applied thereto.

As illustrated in FIG. 2, in each of the pixel electrodes (182G, 182B, and 182R), an open slit pattern 182a is defined by the stem portion 182G-1, 182B-1 or 182R-1 and the branch portions 182G-3, 182B-3 or 182R-3. The open slit pattern 182a may include bar-shaped portions, which extend at an inclination with respect to the perpendicular direction to the extending direction of the stem portion 182G-1, 182B-1 or 182R-1. One side of the open slit pattern 182a may be blocked by the stem portion 182G-1, 182B-1 or 182R-1, and the other side of the open slit pattern 182a may be open due to the absence of the stem portion 182G-1, 182B-1 or 182R-1. Since the open slit pattern 182a has portions extending at an inclination with respect to the perpendicular direction to the extending direction of the stem portion 182G-1, 182B-1 or 182R-1, the LCD 10 may have a high contrast ratio in the horizontal direction, compared to a conventional LCD with vertical slit patterns.

In an exemplary embodiment, each of the pixel electrodes (182G, 182B, and 182R) of the LCD 10 includes the open slit pattern 182a, the LCD 10 may have a high transmittance, compared to a conventional LCD with closed slit patterns having a stem portion on both sides thereof.

A data voltage provided by each of the TFTs may be provided to the entire branch portions 182G-3, 182B-3 or 182R-3 through the stem portion 182G-1, 182B-1 or 182R-1.

As illustrated in FIG. 2, in an exemplary embodiment, when a rubbing direction R/B coincides with the first direction (i.e., the horizontal direction), an electric field may be formed in part of the liquid crystal layer 300 corresponding to the main extension portion 182G-32, 182B-32 or 182R-32 and the open slit pattern 182a between the main extension portion 182G-32, 182B-32 or 182R-32 and the common electrode 162 in response to a data voltage being applied to each of the pixel electrodes (182G, 182B, and 182R). Accordingly, horizontal electric field components may be formed in the vertical direction, and as a result, liquid crystal molecules 302 may be rotated to improve the transmittance of the liquid crystal layer 300.

In such an embodiment, since no electric field is formed in part of the liquid crystal layer 300 corresponding to the stem portion 182G-1, 182B-1 or 182R-1 in the vertical direction, liquid crystal molecules 304 may continue to maintain the original alignment state thereof even in response to a data voltage being applied thereto. As a result, the stem portion 182G-1, 182B-1 or 182R-1 may correspond to a dark area.

An electric field is formed in part of the liquid crystal layer 300 corresponding to the first bent portion 182G-31, 182B-31 or 182R-31 and the second 182G-33, 182B-33 or 182R-33 not only in the vertical direction, but also in the horizontal direction due to the presence of the stem portion 182G-33, 182B-33 or 182R-33 near the first bent portion 182G-31, 182B-31 or 182R-31 and the second 182G-33, 182B-33 or 182R-33.

Blue light generally has low luminance, compared to green light and red light, and thus, the color mixing margin therefor with respect to green light and red light may be susceptible. In one exemplary embodiment, for example, as illustrated in FIG. 2, in response to the first pixel electrode 182G corresponding to the green color filter 212G being disposed on the left side of the second pixel electrode 182B corresponding to the blue color filter 212B, the color mixing margin for blue light with respect to green light from a left viewing angle may be highly susceptible.

Referring to FIGS. 2 to 5, in some exemplary embodiments, the stem portion 182G-1 of the first pixel electrode 182G corresponding to the green color filter 212G may be disposed near or adjacent to the second pixel electrode 182B corresponding to the blue color filter 212B. Accordingly, a dark area that transmits no light L therethrough (i.e., an area having a transmittance T of 0, as illustrated in FIG. 5) may be formed, and thus, color mixing failure of blue light caused by green light from a left viewing angle may be improved.

In an exemplary embodiment, as shown in FIGS. 1 to 5, the stem portion 182B-1 of the second pixel electrode 182*6* corresponding to the blue color filter 212*6* may be disposed near the third pixel electrode 182R corresponding to the red color filter 212R, but the invention is not limited thereto. Alternatively, the stem portion 182B-1 of the second pixel electrode 182*6* corresponding to the blue color filter 212*6* may be disposed near the first pixel electrode 182G corresponding to the green color filter 212G.

Figure 6:
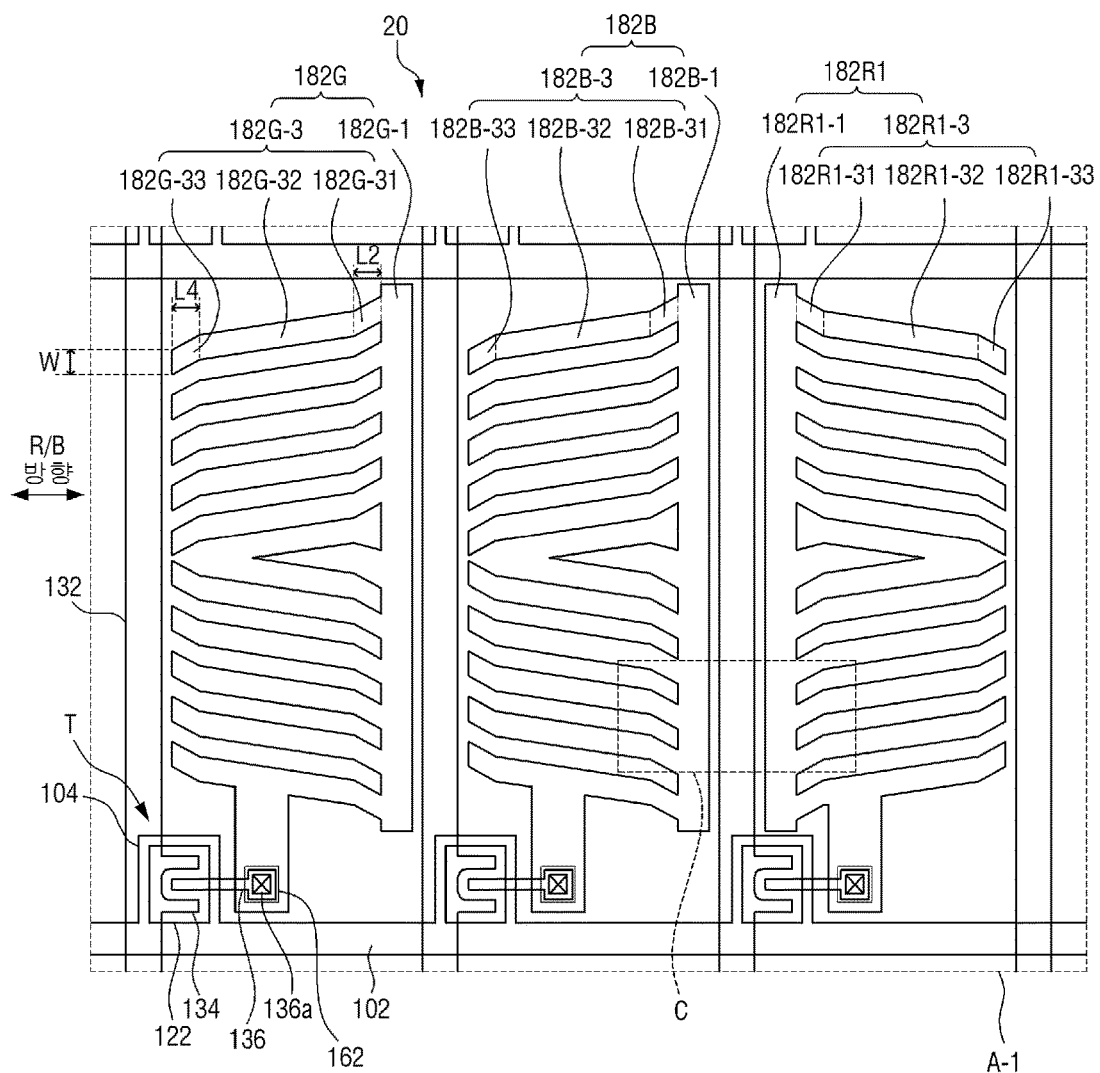
FIG. 6 is a plan view of area A-1 of an LCD according to an alternative exemplary embodiment of the invention, which corresponds to area A of FIG. 1.
Figure 7:
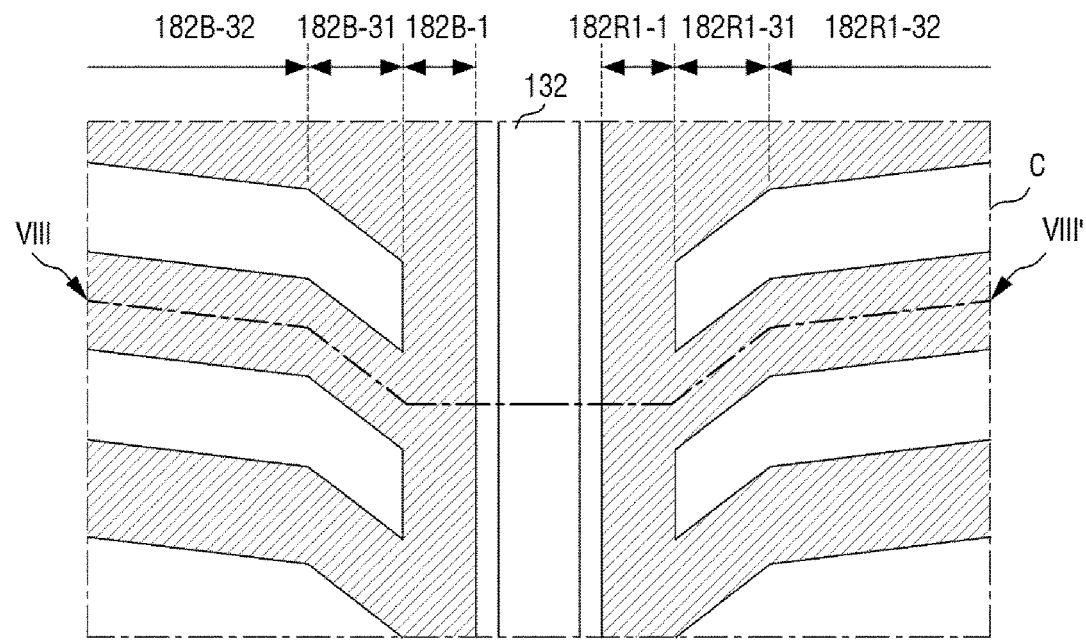
FIG. 7 is an enlarged view of area C of FIG. 6.
Figure 8:
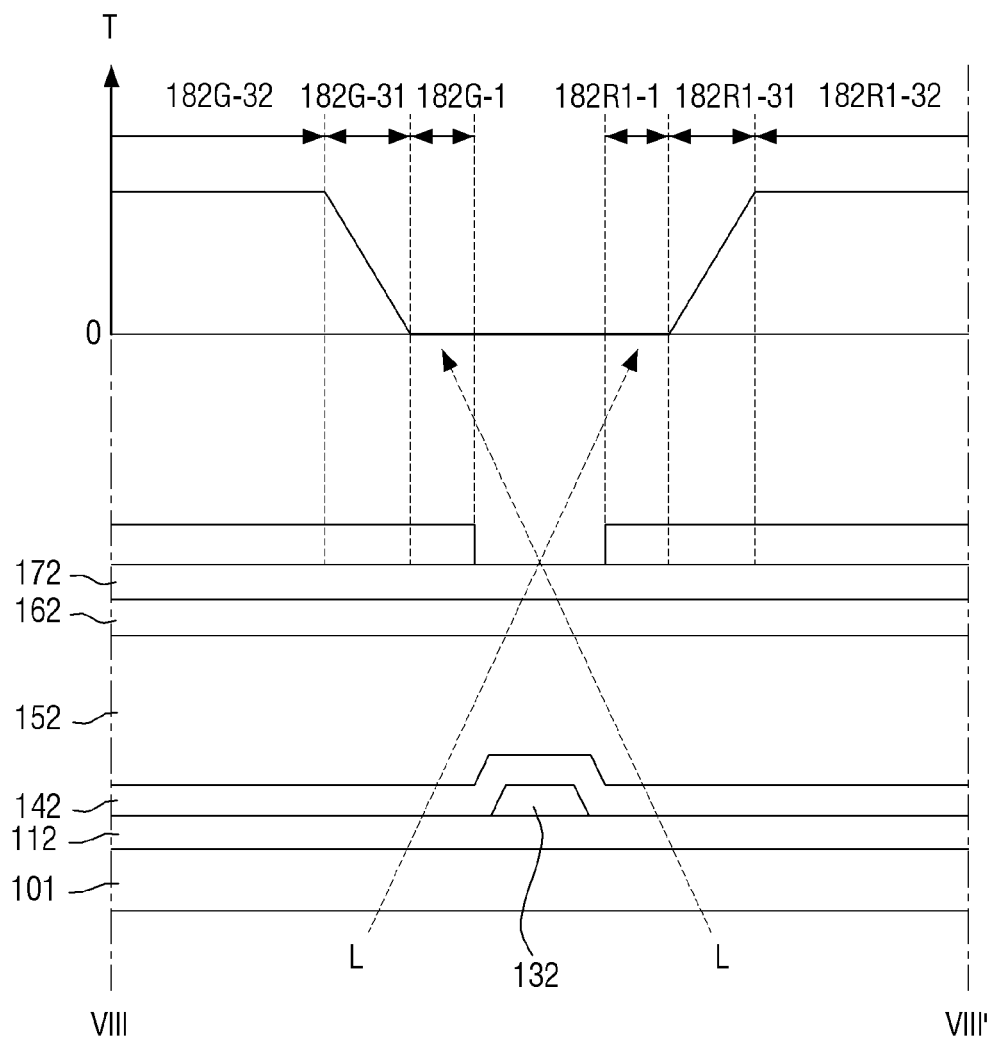
FIG. 8 is a schematic view illustrating the light transmittance in area C of FIG. 6.

FIG. 6 is a plan view of area A-1 of an LCD according to an alternative exemplary embodiment of the invention, which corresponds to area A of FIG. 1. FIG. 7 is an enlarged view of area C of FIG. 6. FIG. 8 is a schematic view illustrating the light transmittance in area C of FIG. 6.

The LCD 20 shown in FIGS. 6 to 8 is substantially the same as, or at least similar to, the LCD 10 shown in FIGS. 1 to 5 except for the structure of a third pixel electrode 182R1 corresponding to a red color filter 212R. The same or like elements shown in FIGS. 6 to 8 have been labeled with the same reference characters as used above to describe the exemplary embodiments of the LCD 10 shown in FIGS. 1 to 5, and any repetitive detailed description thereof will hereinafter be omitted or simplified.

In an exemplary embodiment, as illustrated in FIG. 6, each of a plurality of pixel electrodes (182G, 182B, and 182R1) may include a stem portion 182G-1, 182B-1 or 182R1-1, and a plurality of branch portions 182G-3, 182B-3 or 182R1-3, which are branched off from the stem portion 182G-1, 182B-1 or 182R1-1. Each of the branch portions 182G-3, 182B-3 or 182R1-3 may include a main extension portion 182G-32, 182B-32 or 182R1-32, a first bent portion 182G-31, 182B-31 or 182R1-31, and a second bent portion 182G-33, 182B-33 or 182R1-33.

Blue light generally has low luminance, compared to green light and red light, and thus, the color mixing margin therefor with respect to green light and red light may be susceptible. In one exemplary embodiment, for example, as illustrated in FIG. 6, in response to the third pixel electrode 182R1 corresponding to the red color filter 212R being disposed on the right side of the second pixel electrode 182B corresponding to the blue color filter 212B, the color mixing margin for blue light with respect to red light from a right viewing angle may be highly susceptible.

Referring to FIGS. 6 to 8, in some exemplary embodiments, the stem portion 182R1-1 of the third pixel electrode 182R1 corresponding to the red color filter 212R may be disposed near the second pixel electrode 182B corresponding to the blue color filter 212B. Accordingly, a dark area that transmits no light L therethrough (i.e., an area having a transmittance T of 0, as illustrated in FIG. 8) may be formed, and thus, color mixing failure of blue light caused by red light from a right viewing angle may be improved.

In some exemplary embodiments, as shown in FIG. 2 or 6, each of the pixel electrodes (182G, 182B, and 182R) or (182G, 182B, and 182R1) may include a single stem portion 182G-1, 182B-1 or 182R-1 or 182G-1, 182B-1 or 182R1-1 and a plurality of branch portions 182G-3, 182B-3 or 182R-3, or 182G-3, 182B-3 or 182R1-3, but the invention is not limited thereto. In an alternative exemplary embodiment, two stem portions may be provided in each pixel on both sides of the branch portions 182G-3, 182B-3 or 182R-3, or 182G-3, 182B-3 or 182R1-3.

Figure 9:
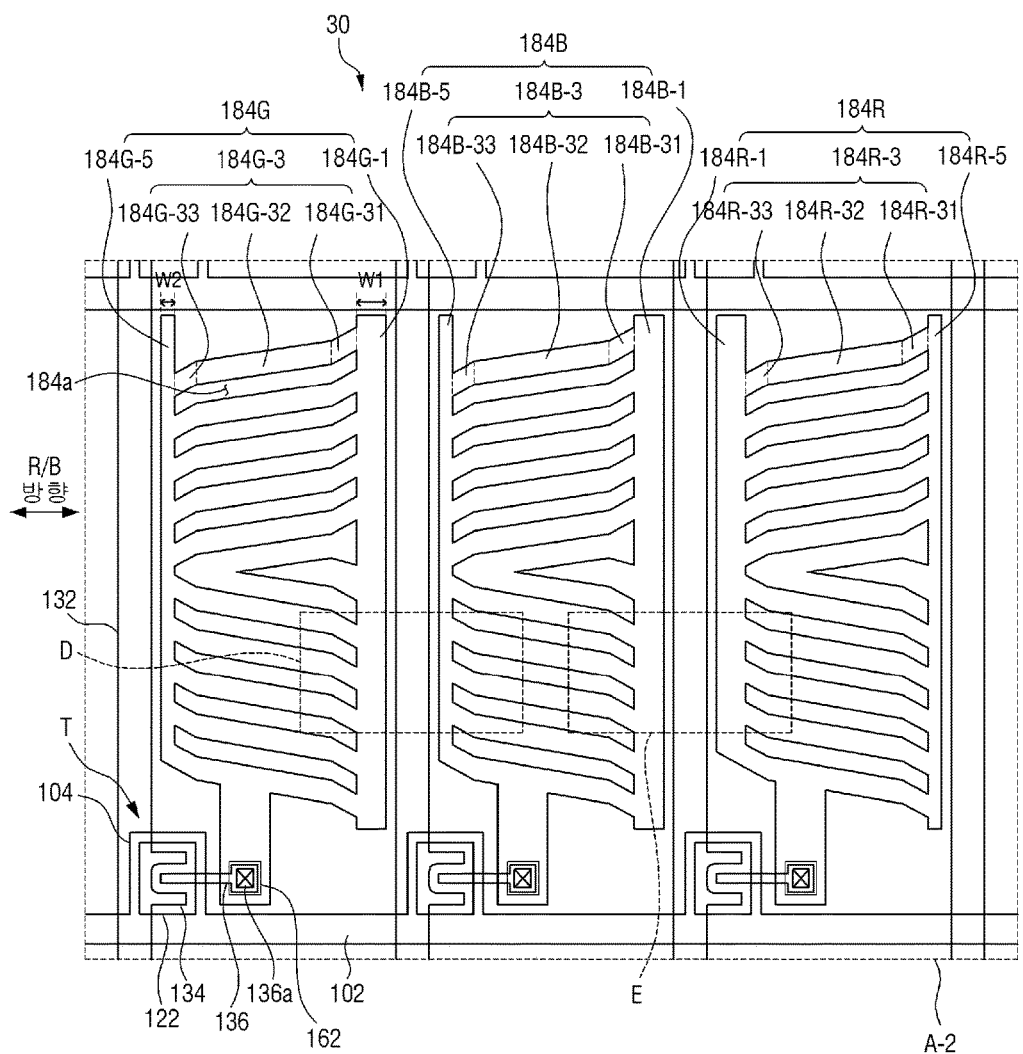
FIG. 9 is an enlarged view of an area of an LCD according to another alternative exemplary embodiment of the invention, which corresponds to area A of FIG. 1.
Figure 10:
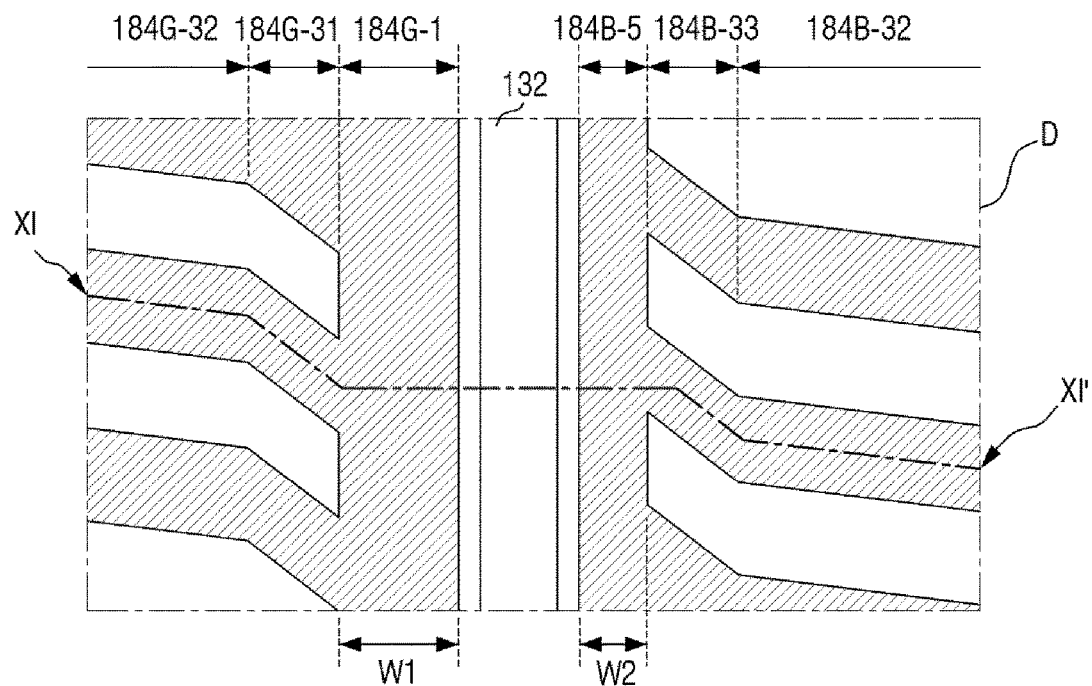
FIG. 10 is an enlarged view of area D of FIG. 9.
Figure 11:
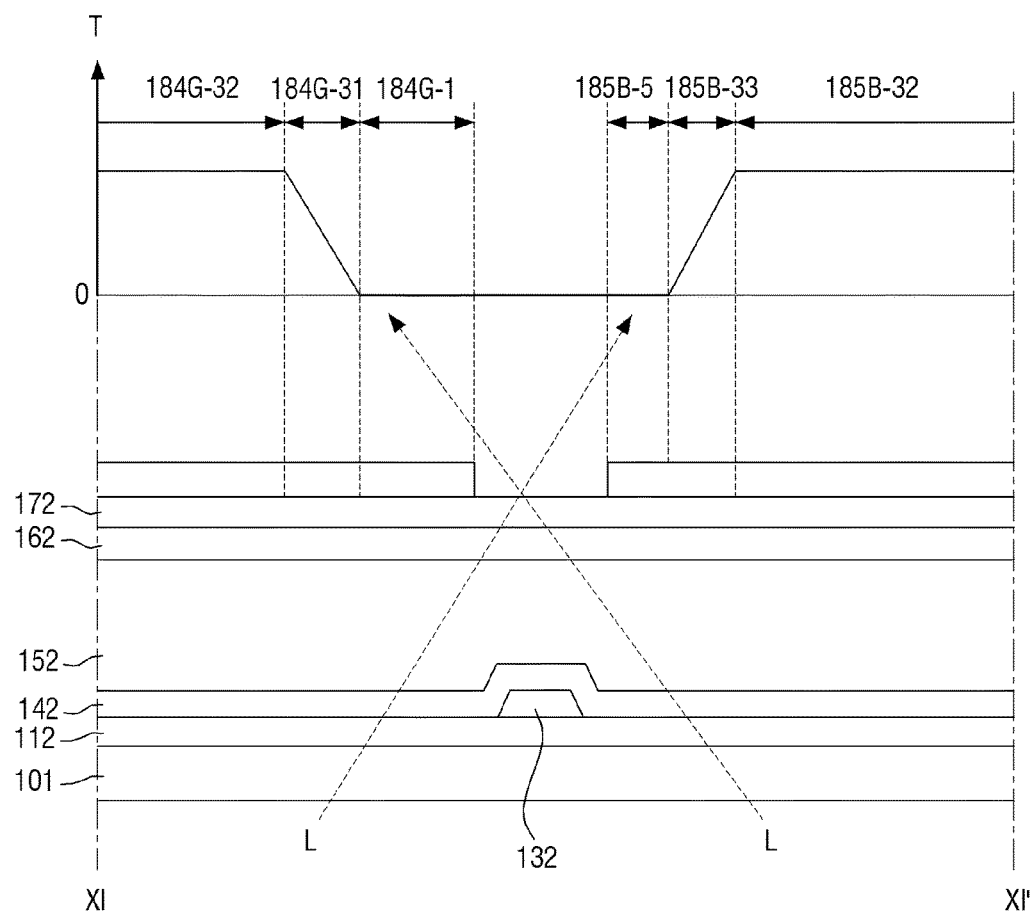
FIG. 11 is a schematic view illustrating the light transmittance in area D of FIG. 9.
Figure 12:
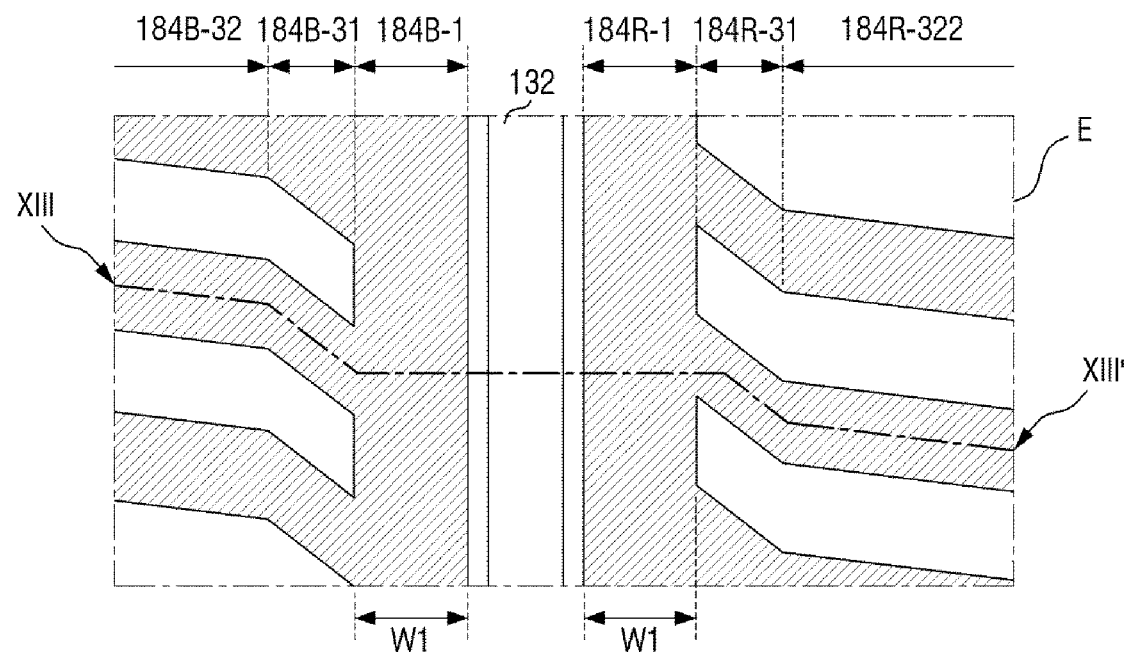
FIG. 12 is an enlarged view of area E of FIG. 9.
Figure 13:
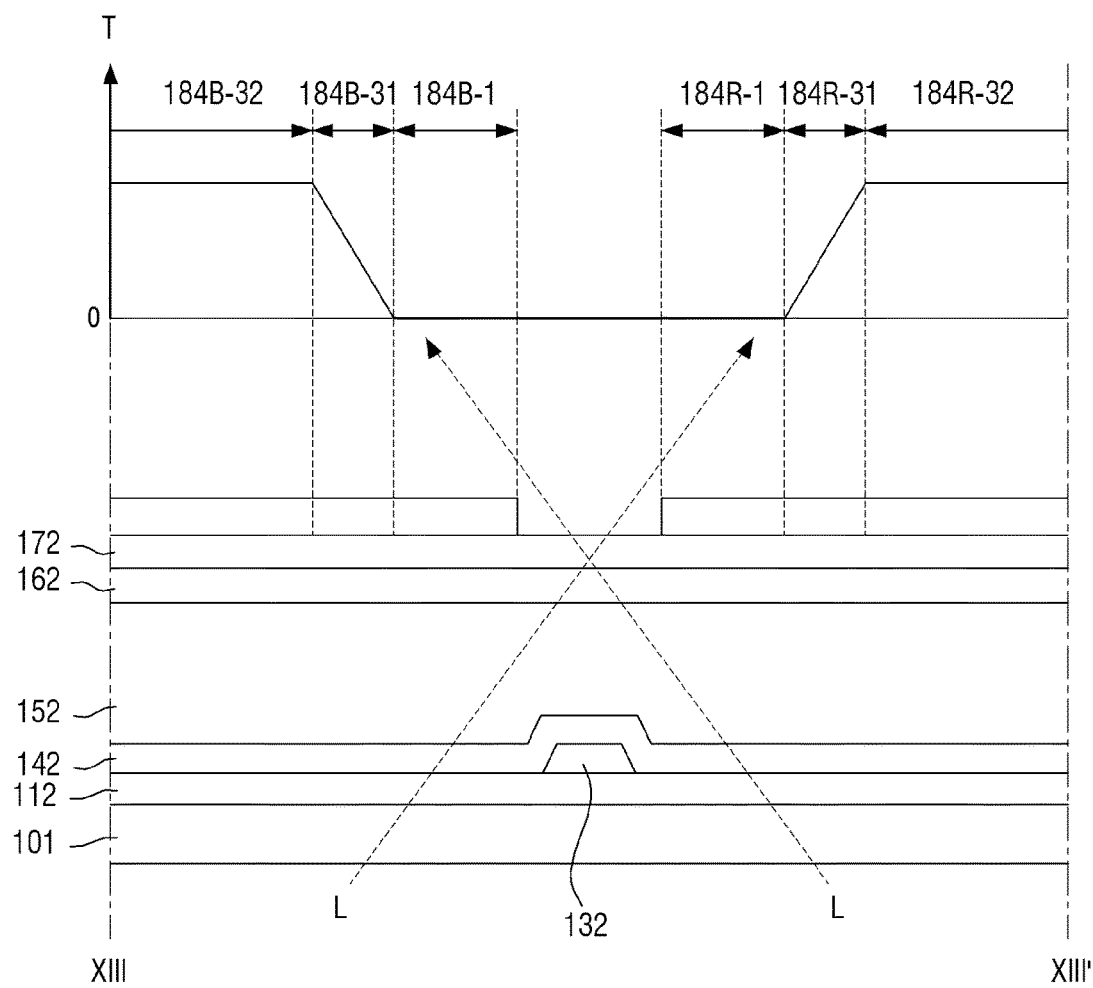
FIG. 13 is a schematic view illustrating the light transmittance in area E of FIG. 9.

FIG. 9 is an enlarged view of an area of an LCD according to another alternative exemplary embodiment of the invention, which corresponds to area A of FIG. 1. FIG. 10 is an enlarged view of area D of FIG. 9. FIG. 11 is a schematic view illustrating the light transmittance in area D of FIG. 9. FIG. 12 is an enlarged view of area E of FIG. 9. FIG. 13 is a schematic view illustrating the light transmittance in area E of FIG. 9.

The LCD 30 shown in FIGS. 9 to 13 is substantially the same as, or at least similar to, the LCD 10 shown in FIGS. 1 to 5 except for the structure of pixel electrodes (184G, 184B, and 184R). The same or like elements shown in FIGS. 9 to 13 have been labeled with the same reference characters as used above to describe the exemplary embodiments of the LCD 10 shown in FIGS. 1 to 5, and any repetitive detailed description thereof will hereinafter be omitted or simplified.

In an exemplary embodiment, as shown in FIG. 9, each of a plurality of pixel electrodes (184G, 184B, and 184R) may include a first stem portion 184G-1, 184B-1 or 184R-1, a plurality of branch portions 184G-3, 184B-3 or 184R-3, and a second stem portion 184G-5, 184B-5 or 184R-5.

In some exemplary embodiments, each of the branch portions 184G-3, 184B-3 or 184R-3 may include a main extension portion 184G-32, 184B-32 or 184R-32, a first bent portion 184G-31, 184B-31 or 184R-31, and a second bent portion 184G-33, 184B-33 or 184R-33.

The first stem portion 184G-1, 184B-1 or 184R-1 and the second stem portion 184G-5, 184B-5 or 184R-5 may in a bar shape extending in the same direction as the extending direction of the data lines 132. The first stem portion 184G-1, 184B-1 or 184R-1 and the second stem portion 184G-5, 184B-5 or 184R-5 may be disposed near the sides of a corresponding pixel. The first stem portion 184G-1, 184B-1 or 184R-1 may be disposed on one side (e.g., a right side) of the corresponding pixel, and the second stem portion 184G-5, 184B-5 or 184R-5 may be disposed on the other side (e.g., a left side) of the corresponding pixel. The first stem portion 184G-1, 184B-1 or 184R-1 and the second stem portion 184G-5, 184B-5 or 184R-5 may be parallel to each other. The first stem portion 184G-1, 184B-1 or 184R-1 and the second stem portion 184G-5, 184B-5 or 184R-5 may be spaced from each other in a perpendicular direction to an extending direction of the data lines 132. The first stem portion 184G-1, 184B-1 or 184R-1 and the second stem portion 184G-5, 184B-5 or 184R-5 may be in a rectangular shape where longitudinal sides thereof extend in the same direction as the extending direction of the data lines 132. Each of the pixel electrodes (184G, 184B, and 184R) may further include the branch portions 184G-3, 184B-3 or 184R-3, which are branched off from the first stem portion 184G-1, 184B-1 or 184R-1 and the second stem portion 184G-5, 184B-5 or 184R-5.

A width W1 of the first stem portion 184G-1, 184B-1 or 184R-1 may be greater than a width W2 of the second stem portion 184G-5, 184B-5 or 184R-5.

In an exemplary embodiment, as illustrated in FIG. 9, the branch portions 184G-3, 184B-3 or 184R-3 may be branched off from the first stem portion 184G-1, 184B-1 or 184R-1 and the second stem portion 184G-5, 184B-5 or 184R-5.

In such an embodiment, the first bent portion 184G-31, 184B-31 or 184R-31 may be disposed between the first stem portion 184G-1, 184B-1 or 184R-1 and the branch portions 184G-3, 184B-3 or 184R-3, and the second bent portion 184G-33, 184B-33 or 184R-33 may be disposed between the second stem portion 184G-5, 184B-5 or 184R-5 and the branch portions 184G-3, 184B-3 or 184R-3.

In such an embodiment, where the first stem portion 184G-1, 184B-1 or 184R-1 and the second stem portion 184G-5, 184B-5 or 184R-5 are disposed on both sides of the branch portions 184G-3, 184B-3 or 184R-3, each of the pixel electrodes (184G, 184B, and 184R) may include a closed slit pattern 184a. The closed slit pattern 184a may include bar-shaped portions, which extend at an inclination with respect to a perpendicular direction to an extending direction of the first stem portion 184G-1, 184B-1 or 184R-1. In such an embodiment, the closed slit pattern 184a has portions extending at an inclination with respect to the perpendicular direction to the extending direction of the first stem portion 184G-1, 184B-1 or 184R-1, such that the LCD 30 may have a high contrast ratio in a horizontal direction, compared to a conventional LCD with vertical slit patterns.

Blue light generally has low luminance, compared to green light and red light, and thus, the color mixing margin therefor with respect to green light and red light, and particularly, with respect to green light having higher luminance than blue light and red light, may be susceptible. In one exemplary embodiment, for example, as illustrated in FIG. 9, in response to the first pixel electrode 184G corresponding to a green color filter 212G being disposed near a left side of the second pixel electrode 184B corresponding to a blue color filter 212B, the color mixing margin for blue light with respect to green light from a left viewing angle may be highly susceptible.

Referring to FIGS. 9 to 11, in some exemplary embodiments, the first stem portion 184G-1 of the first pixel electrode 184G corresponding to the green color filter 212G may be disposed near the second pixel electrode 184B corresponding to the blue color filter 212B. Accordingly, a dark area that transmits no light L therethrough (i.e., an area having a transmittance T of 0, as illustrated in FIG. 11) may be formed, and thus, color mixing failure of blue light caused by green light from a left viewing angle may be improved.

Blue light generally has low luminance, compared to green light and red light, and thus, the color mixing margin therefor with respect to green light and red light may be susceptible. In one exemplary embodiment, for example, as illustrated in FIG. 9, in response to the third pixel electrode 184R corresponding to a red color filter 212R being disposed near a right side of the second pixel electrode 184B corresponding to the blue color filter 212B, the color mixing margin for blue light with respect to red light from a right viewing angle may be highly susceptible.

Referring to FIGS. 9, 12 and 13, in some exemplary embodiments, the first stem portion 184R-1 of the third pixel electrode 184R corresponding to the red color filter 212R may be disposed near the second pixel electrode 184B corresponding to the blue color filter 212B. Accordingly, a dark area that transmits no light L therethrough (i.e., an area having a transmittance T of 0, as illustrated in FIG. 13) may be formed, and thus, color mixing failure of blue light caused by red light from a right viewing angle may be improved.

In the exemplary embodiment of FIGS. 9 to 13, the first stem portion 184B-1 of the second pixel electrode 184B corresponding to the blue color filter 212B may be disposed near the third pixel electrode 184R corresponding to the red color filter 212R, and the second stem portion 184B-5 of the second pixel electrode 184B corresponding to the blue color filter 212B may be disposed near the first pixel electrode 184G corresponding to the green color filter 212G. However, the invention is not limited to the exemplary embodiment of FIGS. 9 to 13. In an alternative exemplary embodiment, the first stem portion 184B-1 of the second pixel electrode 184B corresponding to the blue color filter 212B may be disposed near the first pixel electrode 184G corresponding to the green color filter 212G, and the second stem portion 184B-5 of the second pixel electrode 184B corresponding to the blue color filter 212B may be disposed near the third pixel electrode 184R corresponding to the red color filter 212R.

Figure 14:
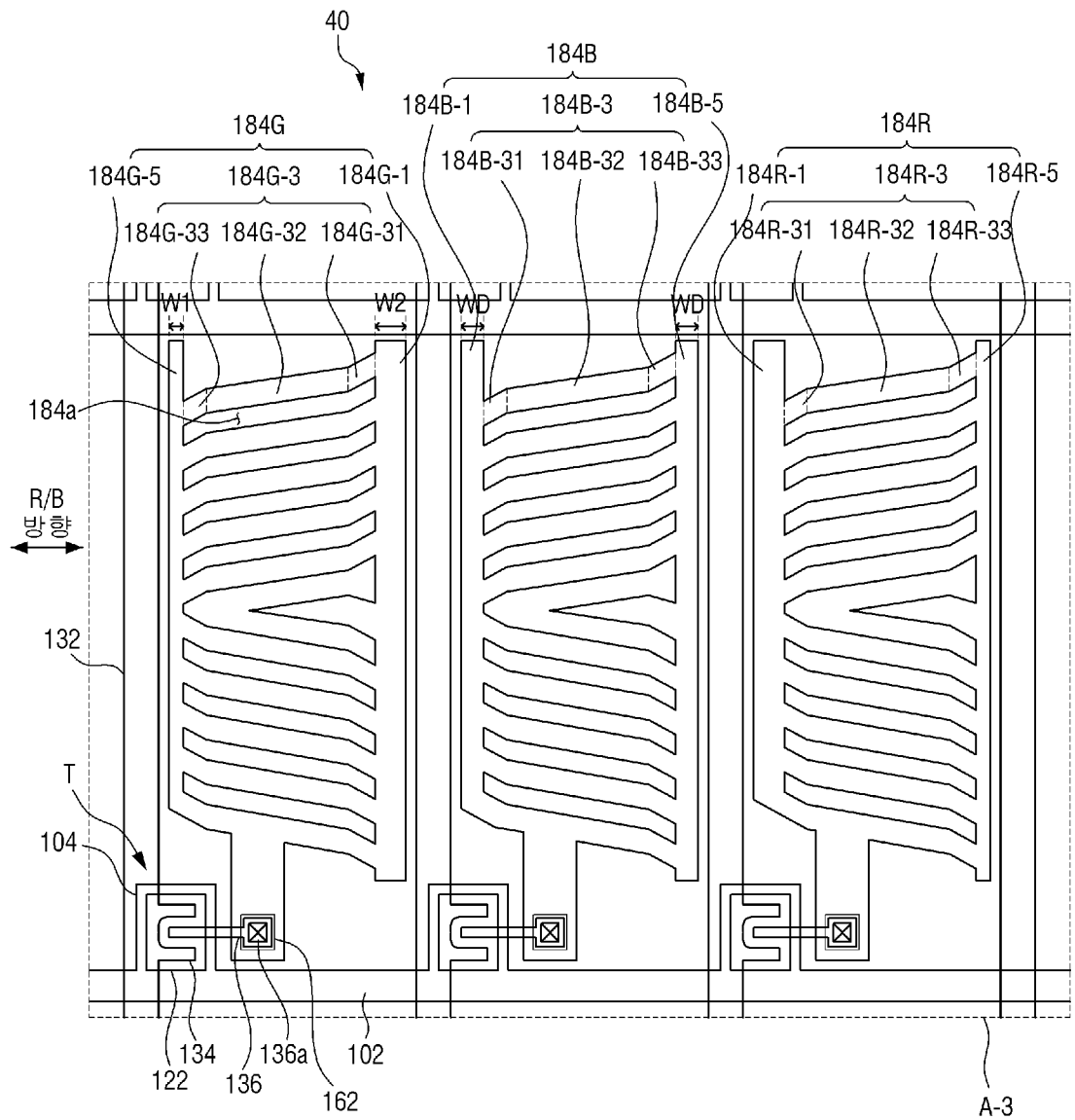
FIG. 14 is an enlarged view of an area of an LCD according to another alternative exemplary embodiment of the invention, which corresponds to area A of FIG. 1.

FIG. 14 is an enlarged view of an area of an LCD according to another alternative exemplary embodiment of the invention, which corresponds to area A of FIG. 1.

The LCD 40 shown in FIG. 14 is substantially the same as, or at least similar to, the LCD 30 shown in FIG. 9 except for the structure of a second pixel electrode 184B1 corresponding to a blue color filter 212B. The same or like elements shown in FIG. 14 have been labeled with the same reference characters as used above to describe the exemplary embodiments of the LCD 30 shown in FIG. 9, and any repetitive detailed description thereof will hereinafter be omitted or simplified.

The second pixel electrode 184B1 corresponding to the blue color filter 212B may include a first stem portion 184B1-1 and a second stem portion 184B1-5. The first and second stem portions 184B1-1 and 184B1-5 may have the same width as each other, i.e., a width WD.

The width WD of the first and second stem portions 184B1-1 and 184B1-5 may be the average of a width W1 of a first stem portion 184G-1 or 184R-1 and a width W2 of a second stem portion 184G-5 or 184R-5 of a first or third pixel electrode 184G or 184R corresponding to a green or red color filter 212G or 212R.

In some exemplary embodiments, each of the plurality of branch portions 184G-3, 184B-3 or 184R-3 may include a main extension portion 184G-32, 184B-32 or 184R-32, a first bent portion 184G-31, 184B-31 or 184R-31, and a second bent portion 184G-31, 184B-31 or 184R-31, but the invention is not limited thereto. In an alternative exemplary embodiment, each of the branch portions 184G-3, 184B-3 or 184R-3 may include only the main extension portion 184G-32, 184B-32 or 184R-32 without the first bent portion 184G-31, 184B-31 or 184R-31 and the second bent portion 184G-31, 184B-31 or 184R-31.

Figure 15:
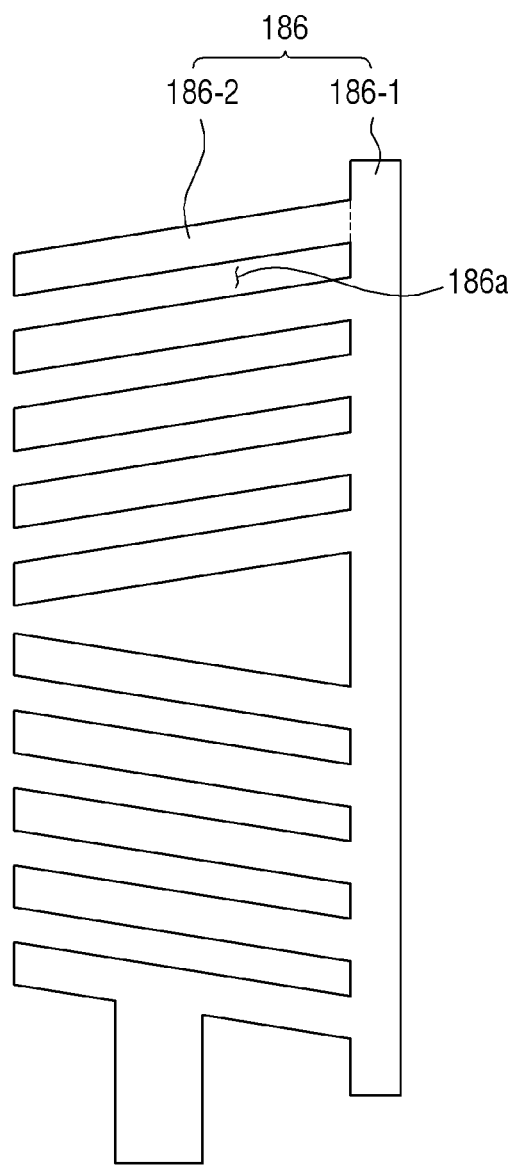
FIGS. 15 and 16 are plan views illustrating the structures of pixel electrodes of LCDs according to other exemplary embodiment of the invention.
Figure 16:
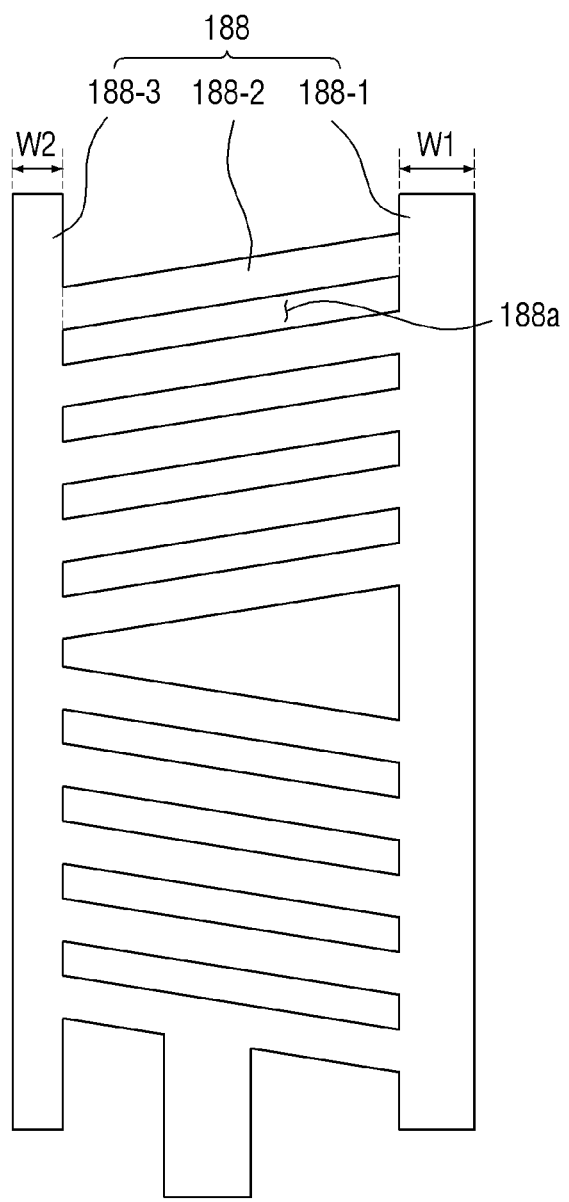

FIGS. 15 and 16 are plan views illustrating the structures of pixel electrodes of LCDs according to other exemplary embodiment of the invention.

Referring to FIG. 15, in an exemplary embodiment, a pixel electrode 186 may include a stem portion 186-1 and a plurality of branch portions 186-2, which are branched off from the stem portion 186-1. The branch portions 186-2 may be in a bar shape extending at an inclination with respect to a direction in which the stem portion 186-1 extends or an extending direction of the stem portion 186-1. In such an embodiment, an open slit pattern 186a may be defined in the pixel electrode 186 by the branch portions 186-2. The structure of the pixel electrode 186 of FIG. 15 is applicable to the pixel electrodes (182G, 182B, and 182R) of FIGS. 1 to 5 or the pixel electrodes (182G, 1826, and 182R1) of FIGS. 6 to 8.

Referring to FIG. 16, in an exemplary embodiment, a pixel electrode 188 may include a first stem portion 188-1, a second stem portion 188-3, and a plurality of branch portions 188-2, which are disposed between, and branched off from, the first and second stem portions 188-1 and 188-3. The branch portions 188-2 may be in a bar shape extending at an inclination with respect to a direction in which the first and second stem portions 188-1 and 188-3 extend or an extending direction of the first and second stem portions 188-1 and 188-3. The width of the first stem portion 188-1 may be greater than the width of the second stem portion 188-3. The pixel electrode 188 may include a closed slit pattern 188a. The structure of the pixel electrode 188 is applicable to the pixel electrodes (184G, 184B, and 184R) of FIGS. 9 to 13 or the pixel electrodes (184G, 184B, and 184R) of FIG. 14.

While the invention has been particularly shown and described with reference to exemplary embodiments thereof, it will be understood by those of ordinary skill in the art that various changes may be made therein without departing from the spirit and scope of the invention as defined by the following claims. The exemplary embodiments should be considered in a descriptive sense only and not for purposes of limitation.

What is claimed is:
1. A liquid crystal display comprising:
a first substrate, on which a plurality of pixel regions is defined;
a second substrate disposed opposite to the first substrate;
a liquid crystal layer disposed between the first and second substrates;
a plurality of gate lines disposed on the first substrate;
a plurality of data lines disposed on the first substrate and intersecting the gate lines;
a plurality of pixel electrodes disposed on the first substrate in the pixel regions, respectively; and
a plurality of green, blue and red color filters disposed on the second substrate,
wherein
the pixel electrodes comprise first, second and third pixel electrodes, which correspond to the green, blue and red color filters, respectively,
each of the first, second and third pixel electrodes comprises:
only one stem portion, which is disposed near one of the data lines and extends in an extending direction of the data lines; and
a plurality of branch portions, which are branched off from the stem portion, the stem portion of the first pixel electrode is disposed near the second pixel electrode, and the second pixel electrode is disposed between the first pixel electrode and the third pixel electrode, and the stem portion of the third pixel electrode is disposed near the second pixel electrode.

2. The liquid crystal display of claim 1, wherein each of the first, second and third pixel electrodes further comprises an open slit pattern.

3. The liquid crystal display of claim 1, wherein the branch portions are in a bar shape extending at an inclination with respect to an extending direction of the stem portion.

4. The liquid crystal display of claim 1, wherein
each of the branch portions consists of:
a main extension portion disposed in a middle of each of the branch portions;
a first bent portion, which is disposed on one side of each of the branch portion and disposed between the stem portion and the main extension portion; and
a second bent portion, which is disposed on the other side of each of the branch portions, and
wherein the first and second bent portions are inclined with respect to a perpendicular direction to an extending direction of the stem portion.

5. The liquid crystal display of claim 4, wherein a degree to which the first or second bent portion is inclined with respect to the perpendicular direction to the extending direction of the stem portion is greater than a degree to which the main extension portion is inclined with respect to the perpendicular direction to the extending direction of the stem portion.

6. The liquid crystal display of claim 1, wherein each of the first, second and third pixel electrodes defines a dual domain.

7. A liquid crystal display comprising:
a first substrate, on which a plurality of pixel regions is defined;
a second substrate disposed opposite to the first substrate;
a liquid crystal layer disposed between the first and second substrates;
a plurality of gate lines disposed on the first substrate;
a plurality of data lines disposed on the first substrate and intersecting the gate lines;
a plurality of pixel electrodes disposed on the first substrate in the pixel regions, respectively; and
a plurality of green, blue and red color filters disposed on the second substrate,
wherein
the pixel electrodes comprise first, second and third pixel electrodes, which correspond to the green, blue and red color filters, respectively,
each of the first, second and third pixel electrodes comprises:
only one stem portion, which is disposed near one of the data lines and extends in an extending direction of the data lines; and
a plurality of branch portions, which are branched off from the stem portion,
each of the branch portions consists of:
a main extension portion disposed in a middle of each of the branch portions:
a first bent portion, which is disposed on one side of each of the branch portions and disposed between the stem portion and the main extension portion; and
a second bent portion, which is disposed on the other side of each of the branch portions, the first and second bent portions are inclined with respect to a perpendicular direction to an extending direction of the stem portion, and a length of the first bent portion and a length of the second bent portion are different each other.

8. The liquid crystal display of claim 7, wherein each of the first, second and third pixel electrodes further comprises an open slit pattern.

9. The liquid crystal display of claim 7, wherein the branch portions are in a bar shape extending at an inclination with respect to an extending direction of the stem portion.

10. The liquid crystal display of claim 7, wherein a degree to which the first or second bent portion is inclined with respect to the perpendicular direction to the extending direction of the stem portion is greater than a degree to which the main extension portion is inclined with respect to the perpendicular direction to the extending direction of the stem portion.

11. The liquid crystal display of claim 7, wherein each of the first, second and third pixel electrodes defines a dual domain.

12. A liquid crystal display comprising:
a first substrate, on which a plurality of pixel regions are defined;
a second substrate disposed opposite to the first substrate;
a liquid crystal layer disposed between the first and second substrates;
a plurality of gate lines disposed on the first substrate;
a plurality of data lines disposed on the first substrate and intersecting the gate lines;
a plurality of pixel electrodes disposed on the first substrate in the pixel regions, respectively; and
a plurality of green, blue and red color filters disposed on the second substrate,
wherein
the pixel electrodes comprise first, second and third pixel electrodes, which correspond to the green, blue and red color filters, respectively,
each of the first, second and third pixel electrodes comprises:
a first stem portion, which is disposed near one of the data lines and extends in an extending direction of the data lines;
a second stem portion, which extends in the extending direction of the data lines and is spaced from the first stem portion in a perpendicular direction to the extending direction of the data lines; and
a plurality of branch portions, which are disposed between, and branched off from, the first and second stem portions,
a width of the first stem portion of the first pixel electrode from which the plurality of branch portions directly extend therefrom is greater than a width of the second stem portion of the first pixel electrode from which the plurality of branch portions directly extend therefrom, and
the first stem portion of the first pixel electrode is disposed near the second pixel electrode.

13. The liquid crystal display of claim 12, wherein
a width of the first stem portion of the third pixel electrode from which the plurality of branch portions directly extend therefrom is greater than a width of the second stem portion of the third pixel electrode from which the plurality of branch portions directly extend therefrom,
the third pixel electrode is disposed between the first and second pixel electrodes, and the first stem portion of the third pixel electrode is disposed near the second pixel electrode.

14. The liquid crystal display of claim 12, wherein each of the first, second and third pixel electrodes further comprises a closed slit pattern.

15. The liquid crystal display of claim 12, wherein the branch portions are in a bar shape extending at an inclination with respect to an extending direction of the first stem portion.

16. The liquid crystal display of claim 12, wherein each of the branch portions consists of:
a main extension portion disposed in a middle of each of the branch portions;
a first bent portion, which is disposed between the first stem portion and the main extension portion; and
a second bent portion, which is disposed between the second stem portion and the main extension portion, and
the first and second bent portions are inclined with respect to a perpendicular direction to an extending direction of the first stem portion.

17. The liquid crystal display of claim 16, wherein a degree to which the first or second bent portion is inclined with respect to the perpendicular direction to the extending direction of the first stem portion is greater than a degree to which the main extension portion is inclined with respect to the perpendicular direction to the extending direction of the first stem portion.

18. The liquid crystal display of claim 12, wherein each of the first, second and third pixel electrodes defines a dual domain.

\* \* \* \* \*